United States Patent
Bailey et al.

(10) Patent No.: US 10,133,075 B2
(45) Date of Patent: Nov. 20, 2018

(54) SYSTEMS, DEVICES, AND METHODS FOR ANGLE- AND WAVELENGTH-MULTIPLEXED HOLOGRAPHIC OPTICAL ELEMENTS

(71) Applicant: THALMIC LABS INC., Kitchener (CA)

(72) Inventors: Matthew Bailey, Kitchener (CA); Stefan Alexander, Elmira (CA); Vance R. Morrison, Kitchener (CA); Thomas Mahon, Guelph (CA); Lloyd Frederick Holland, Kitchener (CA); Jaehong Choi, Waterloo (CA)

(73) Assignee: THALMIC LABS INC., Kitchener (CA)

( * ) Notice: Subject to any disclaimer, the term of this patent is extended or adjusted under 35 U.S.C. 154(b) by 18 days.

(21) Appl. No.: 15/145,609

(22) Filed: May 3, 2016

(65) Prior Publication Data

US 2016/0327797 A1    Nov. 10, 2016

Related U.S. Application Data

(60) Provisional application No. 62/156,736, filed on May 4, 2015.

(51) Int. Cl.
*G02B 5/32* (2006.01)
*G03H 1/00* (2006.01)
(Continued)

(52) U.S. Cl.
CPC ........... *G02B 27/0172* (2013.01); *G02B 5/32* (2013.01); *G02B 27/017* (2013.01);
(Continued)

(58) Field of Classification Search
CPC .... G02B 27/0172; G02B 5/189; G02B 5/188; G02B 6/0033; G02B 2027/0174
(Continued)

(56) References Cited

U.S. PATENT DOCUMENTS 3,408,133 A    10/1968 Lee
3,712,716 A    1/1973 Comsweet et al.
(Continued)

FOREIGN PATENT DOCUMENTS

JP    61-198892 A    9/1986
JP    10-319240 A    12/1998
(Continued)

OTHER PUBLICATIONS

Amitai, "P-27: A Two-Dimensional Aperture Expander for Ultra-Compact, High-Performance Head-Worn Displays," *SID Symposium Digest of Technical Papers* 36(1):360-363, 2005.
(Continued)

*Primary Examiner* — Audrey Y Chang
(74) *Attorney, Agent, or Firm* — Cozen O'Connor

(57) ABSTRACT

Systems, devices, and methods for combined angle- and wavelength multiplexing in holographic optical elements ("HOE") are described. An angle- and wavelength-multiplexed HOE includes multiple angle-multiplexed sets of wavelength-multiplexed holograms. Each set of wavelength-multiplexed holograms includes at least two holograms that are each responsive to a different wavelength of light. Each angle-multiplexed set of wavelength-multiplexed holograms includes a respective set of wavelength-multiplexed holograms that are all responsive to light that is incident thereon with and angle of incidence that is within a particular range. An example application is described in which an angle- and wavelength-multiplexed HOE is used as a holographic combiner in a wearable heads-up display, (Continued)

where angle-multiplexing provides multiple spatially-separated exit pupils in the eyebox of the display and wavelength-multiplexing provides multiple colors to each respective exit pupil.

21 Claims, 4 Drawing Sheets

(51) Int. Cl.
 *G02B 27/01* (2006.01)
 *G03H 1/02* (2006.01)
 *G03H 1/26* (2006.01)

(52) U.S. Cl.
 CPC ....... *G02B 27/0176* (2013.01); *G03H 1/0252* (2013.01); *G03H 1/265* (2013.01); *G03H 1/2645* (2013.01); *G02B 2027/015* (2013.01); *G02B 2027/0123* (2013.01); *G02B 2027/0125* (2013.01); *G02B 2027/0174* (2013.01); *G02B 2027/0178* (2013.01); *G03H 2001/266* (2013.01)

(58) Field of Classification Search
 USPC ..................................... 359/15, 34, 569, 630
 See application file for complete search history.

(56) References Cited

U.S. PATENT DOCUMENTS

| | | | |
|---|---|---|---|
| 4,978,213 A | 12/1990 | El Hage | |
| 5,103,323 A | 4/1992 | Magarinos et al. | |
| 5,231,674 A | 7/1993 | Cleveland et al. | |
| 5,467,104 A | 11/1995 | Furness, III et al. | |
| 5,589,956 A | 12/1996 | Morishima et al. | |
| 5,596,339 A | 1/1997 | Furness, III et al. | |
| 5,742,421 A | 4/1998 | Wells et al. | |
| 5,760,931 A | 6/1998 | Saburi et al. | |
| 6,008,781 A | 12/1999 | Furness, III et al. | |
| 6,027,216 A | 2/2000 | Guyton et al. | |
| 6,139,146 A | 10/2000 | Zhang | |
| 6,184,847 B1 | 2/2001 | Fateh et al. | |
| 6,204,829 B1 | 3/2001 | Tidwell | |
| 6,236,476 B1 | 5/2001 | Son et al. | |
| 6,317,103 B1 | 11/2001 | Furness, III et al. | |
| 6,353,503 B1 | 3/2002 | Spitzer et al. | |
| 6,377,277 B1 | 4/2002 | Yamamoto | |
| 6,545,778 B2 | 4/2003 | Ono et al. | |
| 6,639,570 B2 | 10/2003 | Furness, III et al. | |
| 6,972,734 B1 | 12/2005 | Ohshima et al. | |
| 7,473,888 B2 | 1/2009 | Wine et al. | |
| 7,640,007 B2 | 12/2009 | Chen et al. | |
| 7,684,105 B2 | 3/2010 | Lamontagne et al. | |
| 7,747,113 B2 * | 6/2010 | Mukawa | G02B 6/0033 359/15 |
| 7,773,111 B2 | 8/2010 | Cleveland et al. | |
| 7,850,306 B2 | 12/2010 | Uusitalo et al. | |
| 7,925,100 B2 | 4/2011 | Howell et al. | |
| 7,927,522 B2 | 4/2011 | Hsu | |
| 8,120,828 B2 | 2/2012 | Schwerdtner | |
| 8,179,604 B1 | 5/2012 | Prada Gomez et al. | |
| 8,188,937 B1 | 5/2012 | Amafuji et al. | |
| 8,233,204 B1 | 7/2012 | Robbins et al. | |
| 8,355,671 B2 | 1/2013 | Kramer et al. | |
| 8,560,976 B1 | 10/2013 | Kim | |
| 8,634,119 B2 | 1/2014 | Bablumyan et al. | |
| 8,666,212 B1 | 3/2014 | Amirparviz | |
| 8,704,882 B2 | 4/2014 | Turner | |
| 8,922,481 B1 | 12/2014 | Kauffman et al. | |
| 8,922,898 B2 | 12/2014 | Legerton et al. | |
| 8,970,571 B1 | 3/2015 | Wong et al. | |
| 8,971,023 B2 | 3/2015 | Olsson et al. | |
| 9,086,687 B2 | 7/2015 | Park et al. | |
| 9,135,708 B2 | 9/2015 | Ebisawa | |
| 9,223,152 B1 | 12/2015 | Kress et al. | |
| 2001/0033402 A1 | 10/2001 | Popovich | |
| 2002/0003627 A1 | 1/2002 | Rieder | |
| 2002/0007118 A1 | 1/2002 | Adachi et al. | |
| 2002/0030636 A1 | 3/2002 | Richards | |
| 2002/0093701 A1 | 7/2002 | Zhang et al. | |
| 2002/0120916 A1 | 8/2002 | Snider, Jr. | |
| 2004/0174287 A1 | 9/2004 | Deak | |
| 2005/0012715 A1 | 1/2005 | Ford | |
| 2005/0219668 A1 | 10/2005 | Taghizadeh | |
| 2005/0234348 A1 | 10/2005 | Watanabe et al. | |
| 2006/0238707 A1 | 10/2006 | Elvesjo et al. | |
| 2007/0047038 A1 | 3/2007 | Takizawa | |
| 2007/0078308 A1 | 4/2007 | Daly | |
| 2007/0132785 A1 | 6/2007 | Ebersole, Jr. et al. | |
| 2009/0109241 A1 | 4/2009 | Tsujimoto | |
| 2009/0179824 A1 | 7/2009 | Tsujimoto et al. | |
| 2009/0207464 A1 | 8/2009 | Wiltshire et al. | |
| 2009/0258669 A1 | 10/2009 | Nie et al. | |
| 2009/0322653 A1 | 12/2009 | Putilin et al. | |
| 2010/0053555 A1 | 3/2010 | Enriquez et al. | |
| 2010/0060551 A1 | 3/2010 | Sugiyama et al. | |
| 2010/0142015 A1 | 6/2010 | Kuwahara et al. | |
| 2010/0149073 A1 | 6/2010 | Chaum et al. | |
| 2010/0150415 A1 | 6/2010 | Atkinson et al. | |
| 2010/0157400 A1 | 6/2010 | Dimov et al. | |
| 2010/0239776 A1 | 9/2010 | Yajima et al. | |
| 2012/0002256 A1 | 1/2012 | Lacoste et al. | |
| 2012/0139817 A1 | 6/2012 | Freeman | |
| 2012/0169752 A1 | 7/2012 | Kurozuka | |
| 2012/0182309 A1 | 7/2012 | Griffin et al. | |
| 2012/0188158 A1 | 7/2012 | Tan et al. | |
| 2012/0249797 A1 | 10/2012 | Haddick et al. | |
| 2012/0290401 A1 | 11/2012 | Neven | |
| 2012/0302289 A1 | 11/2012 | Kang | |
| 2013/0009853 A1 | 1/2013 | Hesselink et al. | |
| 2013/0016292 A1 | 1/2013 | Miao et al. | |
| 2013/0016413 A1 | 1/2013 | Saeedi et al. | |
| 2013/0088413 A1 | 4/2013 | Raffle et al. | |
| 2013/0135722 A1 | 5/2013 | Yokoyama | |
| 2013/0165813 A1 | 6/2013 | Chang et al. | |
| 2013/0169560 A1 | 7/2013 | Cederlund et al. | |
| 2013/0182224 A1 | 7/2013 | Schwiegerling et al. | |
| 2013/0198694 A1 | 8/2013 | Rahman et al. | |
| 2013/0215235 A1 | 8/2013 | Russell | |
| 2013/0222384 A1 | 8/2013 | Futterer | |
| 2013/0265437 A1 | 10/2013 | Thörn et al. | |
| 2013/0285901 A1 | 10/2013 | Lee et al. | |
| 2013/0293591 A1 | 11/2013 | Miller et al. | |
| 2013/0300652 A1 | 11/2013 | Raffle et al. | |
| 2013/0332196 A1 | 12/2013 | Pinsker | |
| 2013/0335302 A1 | 12/2013 | Crane et al. | |
| 2014/0045547 A1 | 2/2014 | Singamsetty et al. | |
| 2014/0125760 A1 | 5/2014 | Au et al. | |
| 2014/0198034 A1 | 7/2014 | Bailey et al. | |
| 2014/0198035 A1 | 7/2014 | Bailey et al. | |
| 2014/0202643 A1 | 7/2014 | Hikmet et al. | |
| 2014/0204455 A1 | 7/2014 | Popovich et al. | |
| 2014/0204465 A1 | 7/2014 | Yamaguchi | |
| 2014/0226193 A1 | 8/2014 | Sun | |
| 2014/0232651 A1 | 8/2014 | Kress et al. | |
| 2014/0285429 A1 | 9/2014 | Simmons | |
| 2014/0368896 A1 | 12/2014 | Nakazono et al. | |
| 2015/0036221 A1 | 2/2015 | Stephenson | |
| 2015/0145777 A1 | 5/2015 | He et al. | |
| 2015/0156716 A1 | 6/2015 | Raffle et al. | |
| 2015/0205126 A1 | 7/2015 | Schowengerdt | |
| 2015/0205134 A1 | 7/2015 | Bailey et al. | |
| 2015/0268821 A1 | 9/2015 | Ramsby et al. | |
| 2015/0325202 A1 | 11/2015 | Lake et al. | |
| 2015/0362734 A1 | 12/2015 | Moser et al. | |
| 2015/0378161 A1 | 12/2015 | Bailey et al. | |
| 2015/0378162 A1 | 12/2015 | Bailey et al. | |
| 2015/0378164 A1 | 12/2015 | Bailey et al. | |
| 2016/0004090 A1 | 1/2016 | Popovich et al. | |
| 2016/0033771 A1 * | 2/2016 | Tremblay | G02B 27/0172 345/8 |
| 2016/0154244 A1 | 6/2016 | Border et al. | |
| 2016/0202081 A1 | 7/2016 | Debieuvre et al. | |

(56) References Cited

U.S. PATENT DOCUMENTS

| | | |
|---|---|---|
| 2016/0227164 A1 | 8/2016 | Klug et al. |
| 2016/0238845 A1 | 8/2016 | Alexander et al. |
| 2016/0246384 A1 | 8/2016 | Mullins et al. |
| 2016/0252742 A1 | 9/2016 | Wakabayashi |
| 2016/0274365 A1 | 9/2016 | Bailey et al. |
| 2016/0274758 A1 | 9/2016 | Bailey |
| 2016/0291543 A1 | 10/2016 | Saito |
| 2016/0313899 A1 | 10/2016 | Noel |
| 2016/0327796 A1 | 11/2016 | Bailey et al. |
| 2016/0349514 A1 | 12/2016 | Alexander et al. |
| 2016/0349515 A1 | 12/2016 | Alexander et al. |
| 2016/0349516 A1 | 12/2016 | Alexander et al. |
| 2016/0377865 A1 | 12/2016 | Alexander et al. |
| 2016/0377866 A1 | 12/2016 | Alexander et al. |
| 2017/0068095 A1 | 3/2017 | Holland et al. |
| 2017/0097753 A1 | 4/2017 | Bailey et al. |
| 2017/0115483 A1 | 4/2017 | Aleem et al. |
| 2017/0153701 A1 | 6/2017 | Mahon et al. |
| 2017/0180690 A1 | 6/2017 | Jackson |
| 2017/0199383 A1 | 7/2017 | Machida |
| 2017/0205876 A1 | 7/2017 | Vidal et al. |
| 2017/0212290 A1 | 7/2017 | Alexander et al. |
| 2017/0212349 A1 | 7/2017 | Bailey et al. |
| 2017/0219829 A1 | 8/2017 | Bailey |
| 2017/0299956 A1 | 10/2017 | Holland et al. |
| 2017/0343796 A1 | 11/2017 | Bailey et al. |
| 2017/0343797 A1 | 11/2017 | Bailey et al. |
| 2018/0007255 A1 | 1/2018 | Tang |
| 2018/0035087 A1 | 2/2018 | Xu |
| 2018/0045955 A1 | 2/2018 | Alexander et al. |
| 2018/0129052 A1 | 5/2018 | Morrison |
| 2018/0129057 A1 | 5/2018 | Morrison et al. |
| 2018/0129058 A1 | 5/2018 | Morrison et al. |

FOREIGN PATENT DOCUMENTS

| | | |
|---|---|---|
| JP | 2013-127489 A | 6/2013 |
| JP | 2013-160905 A | 8/2013 |
| KR | 10-2004-0006609 A | 1/2004 |
| WO | 2014/155288 A2 | 10/2014 |
| WO | 2015/123775 A1 | 8/2015 |

OTHER PUBLICATIONS

Äyräs et al., "Exit pupil expander with a large field of view based on diffractive optics," *Journal of the SID* 17(8):659-664, 2009.

Chellappan et al., "Laser-based displays: a review," *Applied Optics* 49(25):F79-F98, 2010.

Cui et al., "Diffraction from angular multiplexing slanted volume hologram gratings," *Optik* 116:118-122, 2005.

Curatu et al., "Dual Purpose Lens for an Eye-Tracked Projection Head-Mounted Display," International Optical Design Conference 2006, *SPIE-OSA* 6342:63420X-1-63420X-7, 2007.

Curatu et al., "Projection-based head-mounted display with eye-tracking capabilities," *Proc. of SPIE* 5875:58750J-1-58750J-9, 2005.

Essex, "Tutorial on Optomechanical Beam Steering Mechanisms," OPTI 521 Tutorial, College of Optical Sciences, University of Arizona, 8 pages, 2006.

Fernández et al., "Optimization of a thick polyvinyl alcohol-acrylamide photopolymer for data storage using a combination of angular and peristrophic holographic multiplexing," *Applied Optics* 45(29):7661-7666, 2009.

Hainich et al., "Chapter 10: Near-Eye Displays," *Displays: Fundamentals & Applications*, AK Peters/CRC Press, 2011, 65 pages.

Hornstein et al., "Maradin's Micro-Mirror—System Level Synchronization Notes," SID 2012 Digest, pp. 981-984.

International Search Report, dated Jun. 8, 2016, for PCT/US2016/018293, 17 pages.

International Search Report, dated Jun. 8, 2016, for PCT/US2016/018298, 14 pages.

International Search Report, dated Jun. 8, 2016, for PCT/US2016/018299, 12 pages.

Itoh et al., "Interaction-Free Calibration for Optical See-Through Head-Mounted Displays based on 3D Eye Localization," 2014 IEEE Symposium on 3D User Interfaces (3DUI), pp. 75-82, 2014.

Kessler, "Optics of Near to Eye Displays (NEDs)," Presentation—Oasis 2013, Tel Aviv, Feb. 19, 2013, 37 pages.

Kress et al., "A review of head-mounted displays (HMD) technologies and applications for consumer electronics," *Proc. of SPIE* 8720:87200A-1-87200A-13, 2013.

Kress et al., "Diffractive and Holographic Optics as Optical Combiners in Head Mounted Displays," Proceedings of the 2013 ACM Conference on Pervasive and Ubiquitous Computing Adjunct Publication, pp. 1479-1482, 2013.

Kress, "Optical architectures for see-through wearable displays," Presentation—Bay Area—SID Seminar, Apr. 30, 2014, 156 pages.

Levola, "7.1: Invited Paper: Novel Diffractive Optical Components for Near to Eye Displays," *SID Symposium Digest of Technical Papers* 37(1):64-67, 2006.

Liao et al., "The Evolution of MEMS Displays," *IEEE Transactions on Industrial Electronics* 56(4):1057-1065, 2009.

Lippert, "Chapter 6: Display Devices: RSD™ (Retinal Scanning Display)," *The Avionics Handbook*, CRC Press, 2001, 8 pages.

Majaranta et al., "Chapter 3—Eye-Tracking and Eye-Based Human-Computer Interaction," in *Advances in Physiological Computing*, Springer-Verlag London, 2014, pp. 17-39.

Schowengerdt et al., "Stereoscopic retinal scanning laser display with integrated focus cues for ocular accommodation" *Proc. of SPIE-IS&T Electronic Imaging* 5291:366-376, 2004.

Silverman et al., "58.5L: Late News Paper: Engineering a Retinal Scanning Laser Display with Integrated Accommodative Depth Cues," SID 03 Digest, pp. 1538-1541, 2003.

Takatsuka et al., "Retinal projection display using diffractive optical element," Tenth International Conference on Intelligent Information Hiding and Multimedia Signal Processing, IEEE, 2014, pp. 403-406.

Urey et al., "Optical performance requirements for MEMS-scanner based microdisplays," Conf. on MOEMS and Miniaturized Systems, *SPIE* 4178:176-185, 2000.

Urey, "Diffractive exit-pupil expander for display applications," *Applied Optics* 40(32):5840-5851, 2001.

Viirre et al., "The Virtual Retinal Display: A New Technology for Virtual Reality and Augmented Vision in Medicine," *Proc. of Medicine Meets Virtual Reality*, IOS Press and Ohmsha, 1998, pp. 252-257. (6 pages).

International Search Report and Written Opinion dated Apr. 25, 2017 for corresponding International Application No. PCT/US2016/067246, 12 pages.

International Search Report and Written Opinion, dated Dec. 8, 2016, for International Application No. PCT/US2016/050225, 15 pages.

International Search Report and Written Opinion, dated Jan. 18, 2017, for International Application No. PCT/US2016/054852, 12 pages.

International Search Report and Written Opinion, dated Oct. 13, 2017, for International Application No. PCT/US2017/040323, 16 pages.

International Search Report and Written Opinion, dated Sep. 28, 2017, for International Application No. PCT/US2017/027479, 13 pages.

Janssen, "Radio Frequency (RF)" 2013, retrieved from https://web.archive.org/web/20130726153946/https://www.techopedia.com/definition/5083/radio-frequency-rf, retrieved on Jul. 12, 2017, 2 pages.

Merriam-Webster, "Radio Frequencies" retrieved from https://www.merriam-webster.com/table/collegiate/radiofre.htm, retrieved on Jul. 12, 2017, 2 pages.

\* cited by examiner

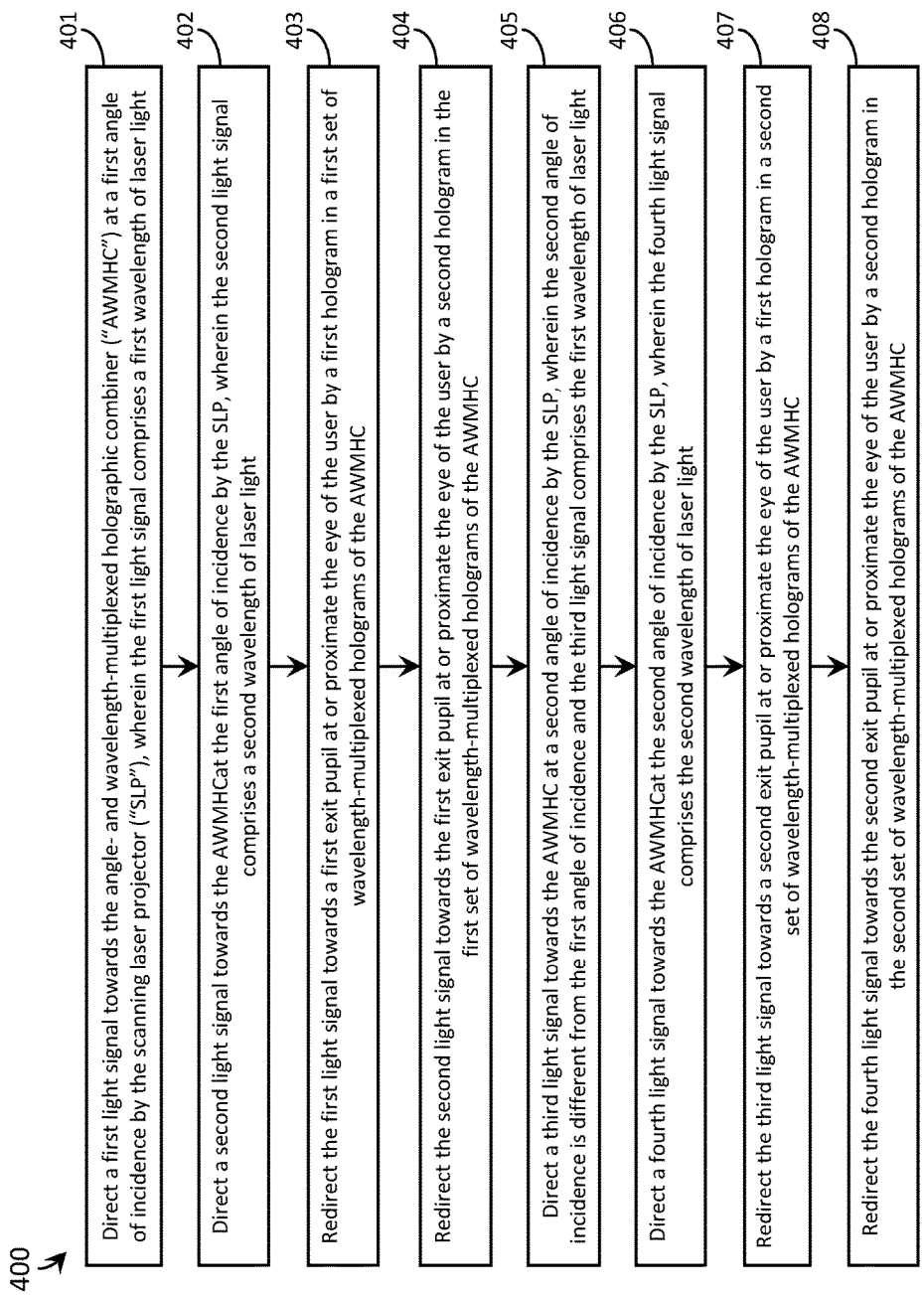

SYSTEMS, DEVICES, AND METHODS FOR ANGLE- AND WAVELENGTH-MULTIPLEXED HOLOGRAPHIC OPTICAL ELEMENTS

TECHNICAL FIELD

The present systems, devices, and methods generally relate to multiplexing in holographic optical elements and particularly relate to using multiplexing to engineer the eyebox of a scanning laser-based wearable heads-up display.

BACKGROUND

Description of the Related Art

Holographic Optical Elements

For the purposes of the present systems, devices, and methods, a holographic optical element is an optical element that includes at least one hologram. Generally, a holographic optical element comprises one or more layer(s) of holographic material with at least one hologram recorded, embedded, stored, or carried (collectively, "included") therein or thereon. A holographic optical element may be a film and/or laminate structure comprising any number of layers and any number of holograms per layer, depending on the specific application.

Wearable Heads-Up Displays

A head-mounted display is an electronic device that is worn on a user's head and, when so worn, secures at least one electronic display within a viewable field of at least one of the user's eyes, regardless of the position or orientation of the user's head. A wearable heads-up display is a head-mounted display that enables the user to see displayed content but also does not prevent the user from being able to see their external environment. The "display" component of a wearable heads-up display is either transparent or at a periphery of the user's field of view so that it does not completely block the user from being able to see their external environment. Examples of wearable heads-up displays include: the Google Glass®, the Optinvent Ora®, the Epson Moverio®, and the Sony Glasstron®, just to name a few.

The optical performance of a wearable heads-up display is an important factor in its design. When it comes to face-worn devices, however, users also care a lot about aesthetics. This is clearly highlighted by the immensity of the eyeglass (including sunglass) frame industry. Independent of their performance limitations, many of the aforementioned examples of wearable heads-up displays have struggled to find traction in consumer markets because, at least in part, they lack fashion appeal. Most wearable heads-up displays presented to date employ large display components and, as a result, most wearable heads-up displays presented to date are considerably bulkier and less stylish than conventional eyeglass frames.

A challenge in the design of wearable heads-up displays is to minimize the bulk of the face-worn apparatus will still providing displayed content with sufficient visual quality. There is a need in the art for wearable heads-up displays of more aesthetically-appealing design that are capable of providing high-quality images to the user without limiting the user's ability to see their external environment.

Eyebox

In near-eye optical devices such as rifle scopes and wearable heads-up displays, the range of eye positions (relative to the device itself) over which specific content/imagery provided by the device is visible to the user is generally referred to as the "eyebox." An application in which content/imagery is only visible from a single or small range of eye positions has a "small eyebox" and an application in which content/imagery is visible from a wider range of eye positions has a "large eyebox." The eyebox may be thought of as a volume in space positioned near the optical device. When the eye of the user (and more particularly, the pupil of the eye of the user) is positioned inside this volume and facing the device, the user is able to see all of the content/imagery provided by the device. When the eye of the user is positioned outside of this volume, the user is not able to see at least some of the content/imagery provided by the device.

The geometry (i.e., size and shape) of the eyebox is an important property that can greatly affect the user experience for a wearable heads-up display. For example, if the wearable heads-up display has a small eyebox that centers on the user's pupil when the user is gazing directly ahead, some or all content displayed by the wearable heads-up display may disappear for the user when the user gazes even slightly off-center, such as slightly to the left, slightly to the right, slightly up, or slightly down. Furthermore, if a wearable heads-up display that has a small eyebox is designed to align that eyebox on the pupil for some users, the eyebox will inevitably be misaligned relative to the pupil of other users because not all users have the same facial structure. Unless a wearable heads-up display is deliberately designed to provide a glanceable display (i.e., a display that is not always visible but rather is only visible when the user gazes in a certain direction), it is generally advantageous for a wearable heads-up display to have a large eyebox.

Demonstrated techniques for providing a wearable heads-up display with a large eyebox generally necessitate adding more bulky optical components to the display. Technologies that enable a wearable heads-up display of minimal bulk (relative to conventional eyeglass frames) to provide a large eyebox are generally lacking in the art.

BRIEF SUMMARY

An angle- and wavelength-multiplexed holographic optical element ("HOE") may be summarized as including: at least one layer of holographic material that includes: a first set of wavelength-multiplexed holograms, wherein each respective hologram in the first set of wavelength-multiplexed holograms is responsive to light of a respective wavelength and unresponsive to light of other wavelengths, and wherein all of the holograms in the first set of wavelength-multiplexed holograms are responsive to light that is incident thereon with an angle of incidence that is within a first range of angles of incidence and unresponsive to light that is incident thereon with an angle of incidence that is outside of the first range of angles of incidence; and a second set of wavelength-multiplexed holograms, wherein each respective hologram in the second set of wavelength-multiplexed holograms is responsive to light of a respective wavelength and unresponsive to light of other wavelengths, and wherein all of the holograms in the second set of wavelength-multiplexed holograms are responsive to light that is incident thereon with an angle of incidence that is within a second range of angles of incidence and unresponsive to light that is incident thereon with an angle of incidence that is outside of the second range of angles of incidence, the second range of angles of incidence different from the first range of angles of incidence.

The first set of wavelength-multiplexed holograms may include: a first hologram that is responsive to light of a first wavelength and unresponsive to light of other wavelengths and a second hologram that is responsive to light of a second wavelength and unresponsive to light of other wavelengths, the second wavelength different from the first wavelength. The second set of wavelength-multiplexed holograms may include: a first hologram that is responsive to light of the first wavelength and unresponsive to light of other wavelengths and a second hologram that is responsive to light of the second wavelength and unresponsive to light of other wavelengths. The first set of wavelength-multiplexed holograms may include a third hologram that is responsive to light of a third wavelength and unresponsive to light of other wavelengths, the third wavelength different from both the first wavelength and the second wavelength. The second set of wavelength-multiplexed holograms may include a third hologram that is responsive to light of the third wavelength and unresponsive to light of other wavelengths.

Each respective hologram in the first set of wavelength-multiplexed holograms may converge light of a respective wavelength to a same first focus, and each respective hologram in the second set of wavelength-multiplexed holograms may converge light of a respective wavelength to a same second focus, the second focus spatially-separated from the first focus. Each respective hologram in the first set of wavelength-multiplexed holograms may apply a same first optical function to light of a respective wavelength, and each respective hologram in the second set of wavelength-multiplexed holograms may apply a same second optical function to light of a respective wavelength, the second optical function different from the first optical function. Both the first optical function and the second optical function may include a reflection function.

At least one layer of holographic material may include a holographic material selected from a group consisting of: a holographic film, a silver halide compound, and a photopolymer. The at least one layer of holographic material may include a first layer of holographic material and both the first set of wavelength-multiplexed holograms and the second set of wavelength-multiplexed holograms may be included in the first layer of holographic material. As an alternative, the at least one layer of holographic material may include a first layer of holographic material that includes the first set of wavelength-multiplexed holograms and a second layer of holographic material that includes the second set of wavelength-multiplexed holograms, the second layer of holographic material carried by the first layer of holographic material. As another alternative, the at least one layer of holographic material may include a stack of layers of holographic material comprising: a first set of layers of holographic material, wherein each layer of holographic material in the first set of layers of holographic material includes a respective one of the wavelength-multiplexed holograms in the first set of wavelength-multiplexed holograms; and a second set of layers of holographic material, wherein each layer of holographic material in the second set of layers of holographic material includes a respective one of the wavelength-multiplexed holograms in the second set of wavelength-multiplexed holograms.

The angle- and wavelength-multiplexed HOE may further include: at least one additional set of wavelength-multiplexed holograms, wherein for each additional set of wavelength-multiplexed holograms: each respective wavelength-multiplexed hologram in the set of wavelength-multiplexed holograms is responsive to light of a respective wavelength and unresponsive to light of other wavelengths; and all of the wavelength-multiplexed holograms in the set of wavelength-multiplexed holograms are responsive to light that is incident thereon with an angle of incidence that is within a particular range of angles of incidence and unresponsive to light that is incident thereon with an angle of incidence that is outside of the particular range of angles of incidence, and wherein each additional set of wavelength-multiplexed holograms is responsive to light that is incident thereon with an angle of incidence that is within a respective range of angles of incidence and unresponsive to light that is incident thereon with an angle of incidence that is outside of the respective range of angles of incidence.

A wearable heads-up display ("WHUD") may be summarized as including: a support structure that in use is worn on a head of a user; a scanning laser projector carried by the support structure; and an angle- and wavelength-multiplexed holographic combiner carried by the support structure, wherein the angle- and wavelength-multiplexed holographic combiner is positioned within a field of view of an eye of the user when the support structure is worn on the head of the user, and wherein the angle- and wavelength-multiplexed holographic combiner comprises at least one layer of holographic material, the at least one layer of holographic material including: a first set of wavelength-multiplexed holograms, wherein each respective hologram in the first set of wavelength-multiplexed holograms is responsive to light of a respective wavelength and unresponsive to light of other wavelengths, and wherein all of the wavelength-multiplexed holograms in the first set of wavelength-multiplexed holograms are positioned and oriented to converge light from the scanning laser projector that is incident thereon with an angle of incidence that is within a first range of angles of incidence to a same first exit pupil at or proximate the eye of the user; and a second set of wavelength-multiplexed holograms, wherein each respective hologram in the second set of wavelength-multiplexed holograms is responsive to light of a respective wavelength and unresponsive to light of other wavelengths, and wherein all of the wavelength-multiplexed holograms in the second set of wavelength-multiplexed holograms are positioned and oriented to converge light from the scanning laser projector that is incident thereon with an angle of incidence that is within a second range of angles of incidence to a same second exit pupil at or proximate the eye of the user, the second exit pupil spatially-separated from the first exit pupil at the eye of the user and the second range of angles of incidence different from the first range of angles of incidence. The support structure may have a general shape and appearance of an eyeglasses frame, and the angle- and wavelength-multiplexed holographic combiner may further include an eyeglass lens that carries the at least one layer of holographic material.

For the angle- and wavelength-multiplexed holographic combiner: the first set of wavelength-multiplexed holograms may include a first hologram that is responsive to light of a first wavelength and unresponsive to light of other wavelengths and a second hologram that is responsive to light of a second wavelength and unresponsive to light of other wavelengths, the second wavelength different from the first wavelength; and the second set of wavelength-multiplexed holograms may include a first hologram that is responsive to light of the first wavelength and unresponsive to light of other wavelengths and a second hologram that is responsive to light of the second wavelength and unresponsive to light of other wavelengths. The first set of wavelength-multiplexed holograms may include a third hologram that is responsive to light of a third wavelength and unresponsive to light of other wavelengths, the third wavelength different from both the first wavelength and the second wavelength; and the second set of wavelength-multiplexed holograms may include a third hologram that is responsive to light of the third wavelength and unresponsive to light of other wavelengths.

For the angle- and wavelength-multiplexed holographic combiner: the at least one layer of holographic material may include a first layer of holographic material and both the first set of wavelength-multiplexed holograms and the second set of wavelength-multiplexed holograms may be included in the first layer of holographic material. As an alternative, the at least one layer of holographic material may include a first layer of holographic material that includes the first set of wavelength-multiplexed holograms and a second layer of holographic material that includes the second set of wavelength-multiplexed holograms, the second layer of holographic material carried by the first layer of holographic material. As another alternative, the at least one layer of holographic material may include a stack of layers of holographic material that comprises: a first set of layers of holographic material, wherein each layer of holographic material in the first set of layers of holographic material includes a respective one of the wavelength-multiplexed holograms in the first set of wavelength-multiplexed holograms; and a second set of layers of holographic material, wherein each layer of holographic material in the second set of layers of holographic material includes a respective one of the wavelength-multiplexed holograms in the second set of wavelength-multiplexed holograms.

The angle- and wavelength-multiplexed holographic combiner may further include at least one additional set of wavelength-multiplexed holograms. For each additional set of wavelength-multiplexed holograms: each respective wavelength-multiplexed hologram in the set of wavelength-multiplexed holograms may be responsive to light of a respective wavelength and unresponsive to light of other wavelengths; and all of the wavelength-multiplexed holograms in the set of wavelength-multiplexed holograms may be positioned and oriented to converge light from the scanning laser projector that is incident thereon with an angle of incidence that is within a particular range of angles of incidence to a same exit pupil at or proximate the eye of the user. Each additional set of wavelength-multiplexed holograms may be positioned and oriented to converge light from the scanning laser projector that is incident thereon with an angle of incidence that is within a respective range of angles of incidence to a same respective exit pupil at or proximate the eye of the user.

The WHUD may further include: an optic carried by the support structure, wherein the optic is positioned in between the scanning laser projector and the angle- and wavelength-multiplexed holographic combiner in an optical path of light from the scanning laser projector, and wherein the optic is oriented to receive light from the scanning laser projector and separate the light into the first range of angles of incidence at the angle- and wavelength-multiplexed holographic combiner and the second range of angles of incidence at the angle- and wavelength-multiplexed holographic combiner.

A method of operating a WHUD, the WHUD including a scanning laser projector and an angle- and wavelength-multiplexed holographic combiner positioned within a field of view of an eye of a user when the WHUD is worn on a head of the user, may be summarized as including: directing a first light signal towards the angle- and wavelength-multiplexed holographic combiner at a first angle of incidence by the scanning laser projector, wherein the first light signal comprises a first wavelength of laser light; directing a second light signal towards the angle- and wavelength-multiplexed holographic combiner at the first angle of incidence by the scanning laser projector, wherein the second light signal comprises a second wavelength of laser light; redirecting the first light signal towards a first exit pupil at or proximate the eye of the user by a first hologram in a first set of wavelength-multiplexed holograms of the angle- and wavelength-multiplexed holographic combiner; redirecting the second light signal towards the first exit pupil at or proximate the eye of the user by a second hologram in the first set of wavelength-multiplexed holograms of the angle- and wavelength-multiplexed holographic combiner; directing a third light signal towards the angle- and wavelength-multiplexed holographic combiner at a second angle of incidence by the scanning laser projector, wherein the second angle of incidence is different from the first angle of incidence and the third light signal comprises the first wavelength of laser light; directing a fourth light signal towards the angle- and wavelength-multiplexed holographic combiner at the second angle of incidence by the scanning laser projector, wherein the fourth light signal comprises the second wavelength of laser light; redirecting the third light signal towards a second exit pupil at or proximate the eye of the user by a first hologram in a second set of wavelength-multiplexed holograms of the angle- and wavelength-multiplexed holographic combiner; and redirecting the fourth light signal towards the second exit pupil at or proximate the eye of the user by a second hologram in the second set of wavelength-multiplexed holograms of the angle- and wavelength-multiplexed holographic combiner.

Redirecting the first light signal towards a first exit pupil at or proximate the eye of the user by a first hologram in a first set of wavelength-multiplexed holograms of the angle- and wavelength-multiplexed holographic combiner may include converging the first light signal towards the first exit pupil at or proximate the eye of the user by the first hologram in the first set of wavelength-multiplexed holograms of the angle- and wavelength-multiplexed holographic combiner. Redirecting the second light signal towards the first exit pupil at or proximate the eye of the user by a second hologram in the first set of wavelength-multiplexed holograms of the angle- and wavelength-multiplexed holographic combiner may include converging the second light signal towards the first exit pupil at or proximate the eye of the user by the second hologram in the first set of wavelength-multiplexed holograms of the angle- and wavelength-multiplexed holographic combiner. Redirecting the third light signal towards a second exit pupil at or proximate the eye of the user by a first hologram in a second set of wavelength-multiplexed holograms of the angle- and wavelength-multiplexed holographic combiner may include converging the third light signal towards the second exit pupil at or proximate the eye of the user by the first hologram in the second set of wavelength-multiplexed holograms of the angle- and wavelength-multiplexed holographic combiner. Redirecting the fourth light signal towards the second exit pupil at or proximate the eye of the user by a second hologram in the second set of wavelength-multiplexed holograms of the angle- and wavelength-multiplexed holographic combiner may include converging the fourth light signal towards the second exit pupil at or proximate the eye of the user by the second hologram in the second set of wavelength-multiplexed holograms of the angle- and wavelength-multiplexed holographic combiner.

The method may further include: directing a fifth light signal towards the angle- and wavelength-multiplexed holographic combiner at the first angle of incidence by the scanning laser projector, wherein the fifth light signal comprises a third wavelength of laser light; directing a sixth light signal towards the angle- and wavelength-multiplexed holographic combiner at the second angle of incidence by the scanning laser projector, wherein the sixth light signal comprises the third wavelength of laser light; redirecting the fifth light signal towards the first exit pupil at or proximate the eye of the user by a third hologram in the first set of wavelength-multiplexed holograms of the angle- and wavelength-multiplexed holographic combiner; and redirecting the sixth light signal towards the second exit pupil at or proximate the eye of the user by a third hologram in the second set of wavelength-multiplexed holograms of the angle- and wavelength-multiplexed holographic combiner.

The method may further include: directing a fifth light signal towards the angle- and wavelength-multiplexed holographic combiner at a third angle of incidence by the scanning laser projector, wherein the third angle of incidence is different from both the first angle of incidence and the second angle of incidence, and wherein the fifth light signal comprises the first wavelength of laser light; directing a sixth light signal towards the angle- and wavelength-multiplexed holographic combiner at the third angle of incidence by the scanning laser projector, wherein the sixth light signal comprises the second wavelength of laser light; redirecting the fifth light signal towards a third exit pupil at or proximate the eye of the user by a first hologram in a third set of wavelength-multiplexed holograms of the angle- and wavelength-multiplexed holographic combiner; and redirecting the sixth light signal towards the third exit pupil at or proximate the eye of the user by a second hologram in the third set of wavelength-multiplexed holograms of the angle- and wavelength-multiplexed holographic combiner.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements are arbitrarily enlarged and positioned to improve drawing legibility. Further, the particular shapes of the elements as drawn are not necessarily intended to convey any information regarding the actual shape of the particular elements, and have been solely selected for ease of recognition in the drawings.

FIG. 4 is a flow-diagram showing a method of operating a wearable heads-up display in accordance with the present systems, devices, and methods.

DETAILED DESCRIPTION

Figure 1:
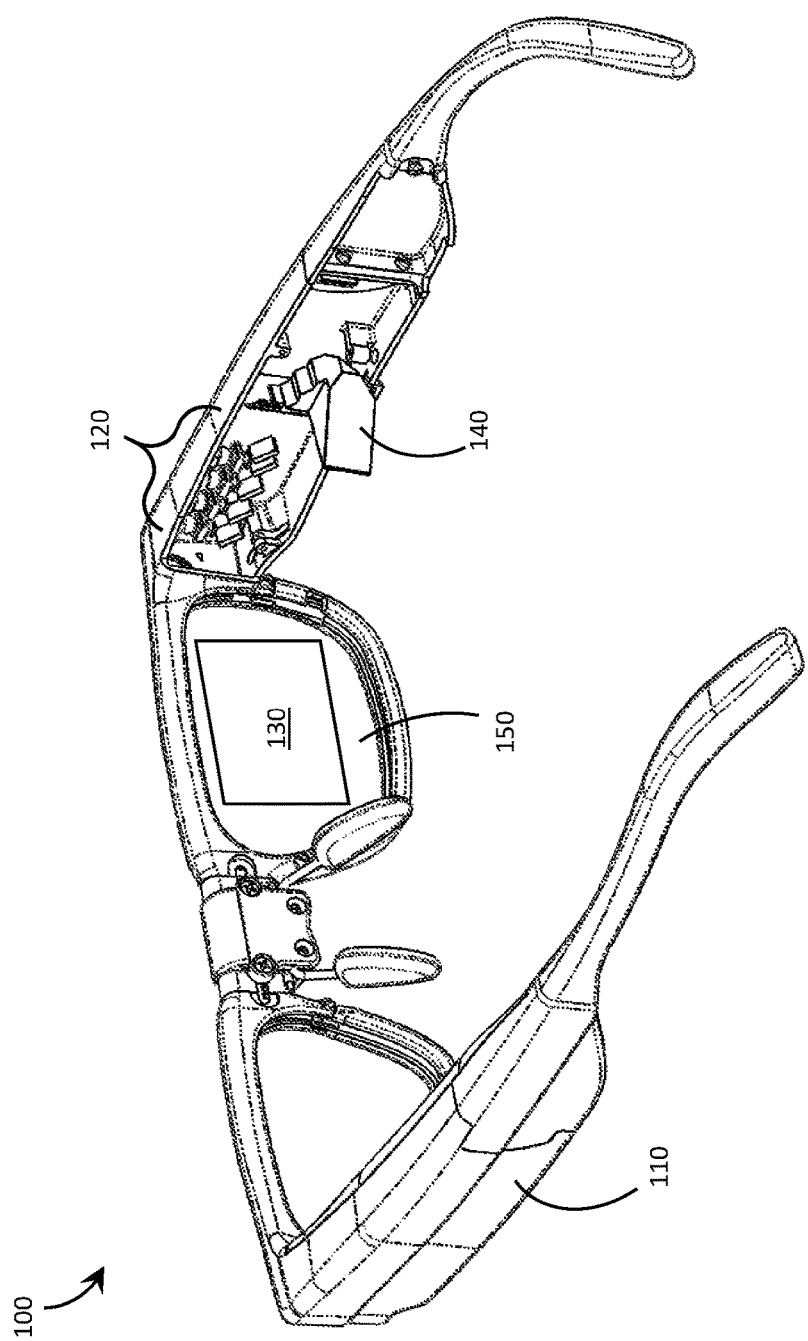
FIG. 1 is a partial-cutaway perspective view of a wearable heads-up display that implements combined angle- and wavelength-multiplexing to project multiple exit pupils in accordance with the present systems, devices, and methods.

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with portable electronic devices and head-worn devices, have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its broadest sense, that is as meaning "and/or" unless the content clearly dictates otherwise.

The headings and Abstract of the Disclosure provided herein are for convenience only and do not interpret the scope or meaning of the embodiments.

The various embodiments described herein provide systems, devices, and methods for combined angle- and wavelength-multiplexing in holographic optical elements ("HOEs"). Combined angle- and wavelength-multiplexing may be useful in a wide range of applications and is particularly well-suited for use in certain architectures of wearable heads-up displays ("WHUDs"), such as scanning laser-based WHUDs.

Generally, a scanning laser-based WHUD is a form of virtual retina display in which a scanning laser projector ("SLP") draws a raster scan onto the eye of the user. In the absence of any further measure the SLP projects light over a fixed area called the exit pupil of the display. In order for the user to see displayed content the exit pupil typically needs to align with, be encompassed by, or overlap with the entrance pupil of the user's eye. The full resolution and/or field of view of the display is visible to the user when the exit pupil of the display is completely contained within the entrance pupil of the eye. For this reason, a scanning laser-based WHUD typically employs a relatively small exit pupil that is equal to or smaller than the expected size of the entrance pupil of the user's eye (e.g., less than or equal to about 4 mm in diameter).

The eyebox of a scanning laser-based WHUD is defined by the geometry of the exit pupil of the display at or proximate the eye of the user. A scanning laser-based WHUD that employs a small exit pupil in order to achieve maximum display resolution and/or field of view typically has the drawback of having a relatively small eyebox. For example, the exit pupil may be aligned with the center of the user's eye so that the eye's pupil is located "within the eyebox" when the user is gazing directly ahead but the eye's pupil may quickly leave the eyebox if and when the user glances anywhere off-center. A larger eyebox may be achieved by increasing the size of the exit pupil but this typically comes at the cost of reducing the display resolution and/or field of view.

Various examples of scanning laser-based WHUDs are described in, at least, U.S. Non-Provisional patent application Ser. No. 15/046,234, U.S. Non-Provisional patent application Ser. No. 15/046,254, and U.S. Non-Provisional patent application Ser. No. 15/046,269, each of which includes a holographic combiner positioned in the field of view of at least one of the user to receive light from the SLP and redirect (e.g., converge) the light towards the eye of the user. In accordance with the present systems, devices, and methods, combined angle- and wavelength-multiplexing of such a holographic combiner may be used to produce multiple exit pupils at or proximate the eye of the user and thereby expand the eyebox of the scanning laser-based WHUD. In some implementations, each respective exit pupil may correspond to an optically replicated or repeated instance of a relatively small exit pupil, and spatially distributing the multiple instances of the exit pupil over a relatively larger area of the user's eye may produce an expanded eyebox, compared to the area of the single exit pupil on its own. In this way, at least one complete instance of the display exit pupil (either as a single instance in its entirety or as a combination of respective portions of multiple instances) may be contained within the perimeter of the eye's pupil for each of a range of eye positions corresponding to a range of gaze directions of the user. In other words, certain applications of the present systems, devices, and methods enable eyebox expansion by exit pupil replication in scanning laser-based WHUDs.

Throughout this specification and the appended claims, the term "replication" is used (e.g., in the context of "exit pupil replication") to generally refer to situations where multiple instances of substantially the same exit pupil and/or display content are produced. The term "exit pupil replication" is intended to generally encompass approaches that produce concurrent (e.g., temporally parallel) instances of an exit pupil as well as approaches that produce sequential (e.g., temporally serial or "repeated") instances of an exit pupil. In many examples, the present systems, devices, and methods provide exit pupil replication by exit pupil repetition or sequential exit pupil tiling. Unless the specific context requires otherwise, references to "exit pupil replication" herein include exit pupil replication by exit pupil repetition.

Exit pupil replication is an example of an application of combined angle- and wavelength-multiplexing in a scanning laser-based WHUD; however, combined angle- and wavelength-multiplexing may also be used to (either instead of or in addition to replicate exit pupils) provide a particular user interface and/or display configuration. In exit pupil replication, each exit pupil corresponds to a respective spatially-separated instance of substantially the same projected content at or proximate the eye of the user. Such can certainly be advantageous, but in some applications combined angle- and wavelength-multiplexing may be used to provide different projected content to different regions of the user's eye and/or field of view. For example, combined angle- and wavelength-multiplexing may be used to provide a first image to a first exit pupil projected at a first position/location at or on the user's eye corresponding to a first position/location in the user's field of view and a second image to a second exit pupil projected at a second position/location at or on the user's eye corresponding to a second position/location in the user's field of view.

FIG. 1 is a partial-cutaway perspective view of a WHUD 100 that implements combined angle- and wavelength-multiplexing to project multiple exit pupils in accordance with the present systems, devices, and methods. WHUD 100 includes a support structure 110 that in use is worn on the head of a user and has a general shape and appearance of an eyeglasses (e.g., sunglasses) frame. Support structure 110 carries multiple components, including: a SLP 120, an angle- and wavelength-multiplexed holographic combiner ("AWMHC") 130, and an optic 140 for routing light signals from SLP 120 to AWMHC 130. Portions of SLP 120 and optic 140 may be contained within an inner volume of support structure 110; however, FIG. 1 provides a partial-cutaway view in which regions of support structure 110 have been removed in order to render visible portions of SLP 120 and optic 140 that may otherwise be concealed.

Throughout this specification and the appended claims, the term "carries" and variants such as "carried by" are generally used to refer to a physical coupling between two objects. The physical coupling may be direct physical coupling (i.e., with direct physical contact between the two objects) or indirect physical coupling that may be mediated by one or more additional objects. Thus, the term carries and variants such as "carried by" are meant to generally encompass all manner of direct and indirect physical coupling, including without limitation: carried on, carried within, physically coupled to, and/or supported by, with or without any number of intermediary physical objects therebetween.

SLP 120 may include multiple laser diodes (e.g., a red laser diode, a green laser diode, and/or a blue laser diode) and at least one scan mirror (e.g., a single two-dimensional scan mirror or two one-dimensional scan mirrors, which may be, e.g., MEMS-based or piezo-based). SLP 120 may be communicatively coupled to (and support structure 110 may further carry) a processor (i.e., circuitry) and a non-transitory processor-readable storage medium or memory storing processor-executable data and/or instructions that, when executed by the processor, cause the processor to control the operation of SLP 120. For ease of illustration, FIG. 1 does not call out a processor or a memory. In some implementations, SLP 120 may employ the systems, devices, and methods for focusing laser projectors described in U.S. Provisional Patent Application Ser. No. 62/322,128.

Optic 140 is carried by support structure 110 and positioned in between SLP 120 and AWMHC 130 in an optical path of light from SLP 120. Optic 140 may perform a variety of different roles or may not be included at all depending on the specific implementation. For example, in some applications optic 140 may be a form of eyebox expansion optic such as any of those described in U.S. Non-Provisional patent application Ser. No. 15/046,234, U.S. Non-Provisional patent application Ser. No. 15/046,254, and U.S. Non-Provisional patent application Ser. No. 15/046,269. In the illustrated implementation of WHUD 100, SLP 120 is oriented to initially project light towards the ear of the user and optic 140 is used to re-route the projected light back towards AWMHC 130. This configuration is used in WHUD 100 to influence/accommodate the form factor of support structure 110 and to provide a desired path length for the optical path of laser light projected from SLP 120 to AWMHC 130, but alternative WHUD implementations may have different requirements and may or may not include an optic such as optic 140.

AWMHC 130 is an angle- and wavelength-multiplexed HOE in accordance with the present systems, devices, and methods and is positioned within a field of view of at least one eye of the user when support structure 110 is worn on the head of the user. AWMHC 130 is sufficiently optically transparent to wavelengths other than the wavelengths of laser light provided by SLP 120 in order to permit light from the user's environment (i.e., "environmental light") to pass through to the user's eye. In the illustrated example of FIG. 1, support structure 110 carries a transparent eyeglass lens 150 (e.g., a prescription eyeglass lens, non-prescription eyeglass lens) and AWMHC 130 comprises at least one layer of holographic material that is adhered to, affixed to, laminated with, carried in or upon, or otherwise integrated with eyeglass lens 150. The at least one layer of holographic material may include a holographic film, a photopolymer such as Bayfol® HX available from Bayer MaterialScience AG, and/or a silver halide compound and may, for example, be integrated with transparent lens 150 using any of the techniques described in U.S. Provisional Patent Application Ser. No. 62/214,600. As will be described in more detail later, the at least one layer of holographic material in AWMHC 130 includes: i) a first set of wavelength-multiplexed holograms, wherein each respective hologram in the first set of wavelength-multiplexed holograms is responsive to light of a respective wavelength and unresponsive to light of other wavelengths, and wherein all of the holograms in the first set of wavelength-multiplexed holograms are responsive to light that is incident thereon with an angle of incidence that is within a first range of angles of incidence and unresponsive to light that is incident thereon with an angle of incidence that is outside of the first range of angles of incidence; and ii) a second set of wavelength-multiplexed holograms, wherein each respective hologram in the second set of wavelength-multiplexed holograms is responsive to light of a respective wavelength and unresponsive to light of other wavelengths, and wherein all of the holograms in the second set of wavelength-multiplexed holograms are responsive to light that is incident thereon with an angle of incidence that is within a second range of angles of incidence and unresponsive to light that is incident thereon with an angle of incidence that is outside of the second range of angles of incidence, the second range of angles of incidence different from the first range of angles of incidence.

In some implementations, a function of optic 140 (when such an optic is included in a WHUD architecture) may be to receive light from SLP 120 and route the light along optical paths corresponding to at least the above-referenced first and second ranges of angles of incidence at AWMHC 130. Such is the case in U.S. Non-Provisional patent application Ser. No. 15/046,234, U.S. Non-Provisional patent application Ser. No. 15/046,254, and U.S. Non-Provisional patent application Ser. No. 15/046,269.

In the exemplary application of angle- and wavelength-multiplexed HOEs in WHUDs described herein, the angle- and wavelength-multiplexing may accomplish two goals. For one, wavelength multiplexing may be used to accommodate, operate on, or otherwise handle multiple colors of light provided by SLP 220 in order to provide multi-colored display content to the user. For another, angle multiplexing may be used to provide multiple exit pupils (e.g., multiple replicated copies of a single exit pupil or multiple heterogeneous exit pupils) to the eye of the user for the purposes of eyebox expansion and/or generally engineering a particular eyebox construction.

Wavelength multiplexing may advantageously be used in a scanning laser-based WHUD that employs a holographic combiner because, typically, a hologram that is engineered to work with laser light is typically recorded, and designed to playback for, a single wavelength of laser light. For example, a hologram for use with a SLP that includes a blue laser diode may be recorded with, and accordingly operational to playback for, blue laser light. SLP 120 of WHUD 100 includes three different laser diodes (i.e., a red laser diode, a green laser diode, and a blue laser diode) in order to provide a multi-color (e.g., a full color) display to the user. Any given laser light signal provided by SLP 120 may include any, all, or any combination of red laser light, green laser light, and blue laser light. In order to redirect such laser light signals towards the eye of the user, AWMHC 130 includes at least one set of wavelength-multiplexed holograms that comprises: i) a first wavelength-multiplexed hologram (e.g., a red hologram) that is responsive to light of a first wavelength (e.g., red light) and unresponsive to light of other wavelengths; ii) a second wavelength-multiplexed hologram (e.g., a green hologram) that is responsive to light of a second wavelength (e.g., green light) and unresponsive to light of other wavelengths; and iii) a third wavelength-multiplexed hologram (e.g., a blue hologram) that is responsive to light of a third wavelength (e.g., blue light) and unresponsive to light of other wavelengths.

Angle multiplexing may advantageously be used in a scanning laser-based WHUD that employs a holographic combiner in order to route various sets of light signals towards respective ones of multiple exit pupils. By various means (e.g., by using multiple spatially-separated SLPs or by using an optic such as optic 140) laser light signals may be routed in such a way that multiple laser light signals impinge on (i.e., are incident on) at least one point of AWMHC 130 at or from multiple angles. In order to redirect such laser light signals towards the eye of the user, AWMHC 130 includes: i) at least a first angle-multiplexed hologram (or set of angle-multiplexed holograms) that is responsive to (e.g., plays back for) light that is incident thereon at an angle of incidence that is within a first range of angles of incidence and that is unresponsive to (e.g., does not playback for) light that is incident thereon at an angle of incidence that is outside of the first range of angles of incidence; and ii) at least a second angle-multiplexed hologram (or set of angle-multiplexed holograms) that is responsive to (e.g., plays back for) light that is incident thereon at an angle of incidence that is within a second range of angles of incidence and that is unresponsive to (e.g., does not playback for) light that is incident thereon at an angle of incidence that is outside of the second range of angles of incidence, where the second range of angles of incidence is different from (e.g., does not overlap with) the first range of angles of incidence. The at least a first angle-multiplexed hologram responds to (e.g., plays back for) light that is incident thereon at an angle of incidence that is within a first range of angles of incidence by redirecting (e.g., reflecting and converging) such light towards a first exit pupil at or proximate the eye of the user. The at least a second angle-multiplexed hologram responds to (e.g., plays back for) light that is incident thereon at an angle of incidence that is within a second range of angles of incidence by redirecting (e.g., reflecting and converging) such light towards a second exit pupil at or proximate the eye of the user. In this way, WHUD 100 uses angle multiplexing to provide multiple exit pupils at or proximate the eye of the user for the purpose of expanding or otherwise engineering the eyebox.

The combination of angle- and wavelength-multiplexing in AWMHC 130 enables the multiple exit pupils provided by angle multiplexing to each include multiple colors (i.e., multiple wavelengths) of laser light. Specifically, each multiplexed range of angles of incidence corresponds to a respective angle-multiplexed set of wavelength-multiplexed holograms. A first angle-multiplexed set of wavelength-multiplexed holograms comprises a first red hologram, a first green hologram, and a first blue hologram. The first red hologram is responsive to (i.e., plays back for by, for example, reflecting and converging) red laser light that is incident thereon over a first range of angles of incidence and does not play back for any light (red or otherwise) that is incident thereon at an angle of incidence that is outside of the first range of angles of incidence; the first green hologram is responsive to (i.e., plays back for by, for example, reflecting and converging) green laser light that is incident thereon over the first range of angles of incidence and does not play back for any light (green or otherwise) that is incident thereon at an angle of incidence that is outside of the first range of angles of incidence; and the first blue hologram is responsive to (i.e., plays back for by, for example, reflecting and converging) blue laser light that is incident thereon over the first range of angles of incidence and does not play back for any light (blue or otherwise) that is incident thereon at an angle of incidence that is outside of the first range of angles of incidence. A second angle-multiplexed set of wavelength-multiplexed holograms comprises a second red hologram, a second green hologram, and a second blue hologram. The second red hologram is responsive to (i.e., plays back for by, for example, reflecting and converging) red laser light that is incident thereon over a second range of angles of incidence and does not play back for any light (red or otherwise) that is incident thereon at an angle of incidence that is outside of the second range of angles of incidence; the second green hologram is responsive to (i.e., plays back for by, for example, reflecting and converging) green laser light that is incident thereon over the second range of angles of incidence and does not play back for any light (green or otherwise) that is incident thereon at an angle of incidence that is outside of the second range of angles of incidence; and the second blue hologram is responsive to (i.e., plays back for by, for example, reflecting and converging) blue laser light that is incident thereon over the second range of angles of incidence and does not play back for any light (blue or otherwise) that is incident thereon at an angle of incidence that is outside of the second range of angles of incidence. In general, the angle- and wavelength-multiplexed HOEs described herein (such as AWMHC 130) may include any number of angle-multiplexed sets of any number of wavelength-multiplexed holograms. The number of wavelength-multiplexed holograms is each set of wavelength-multiplexed holograms generally depends on (e.g., is equal to) the number of wavelengths of light projected or otherwise used in the system (e.g., the number of different wavelengths output by the SLP in a scanning laser-based WHUD). The number of angle-multiplexed sets of wavelength-multiplexed holograms generally depends on (e.g., is equal to) the number of multiplexed angle ranges employed by the system, which may correspond to the number of exit pupils employed by the system (e.g., to form the eyebox of a WHUD).

Figure 2:
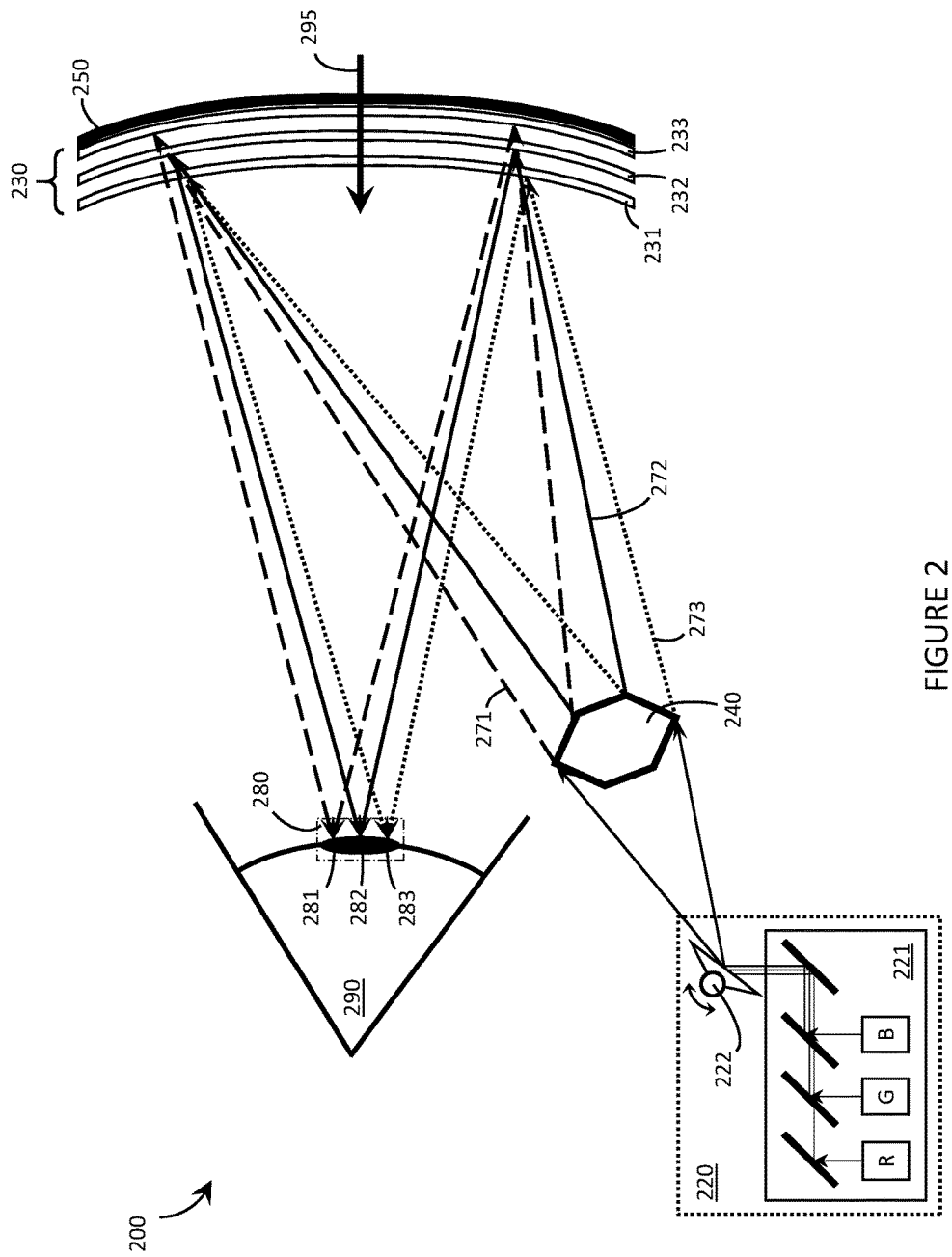
FIG. 2 is an illustrative diagram of a wearable heads-up display showing a wavelength-multiplexed holographic combiner in operation for the purpose of providing multiple spatially-separated exit pupils at the eye of the user in accordance with the present systems, devices, and methods.

FIG. 2 is an illustrative diagram of a WHUD 200 showing an AWMHC 230 in operation for the purpose of providing multiple spatially-separated exit pupils 281, 282, and 283 at the eye 290 of the user, where each exit pupil 281, 282, and 283 includes multiple wavelengths of light in accordance with the present systems, devices, and methods. WHUD 200 may be substantially similar to WHUD 100 from FIG. 1, although in FIG. 2 no support structure (e.g., support structure 110) is illustrated in order to reduce clutter. As with WHUD 100, WHUD 200 comprises a SLP 220 (which includes a RGB laser module 221 and at least one MEMS-based scan mirror 222) and AWMHC 230 is carried by an eyeglass lens 250. As previously described, the combination of AWMHC 230 and eyeglass lens 250 is sufficiently transparent to allow ambient or environmental light 295 to pass through to eye 290.

For the purposes of the present systems, devices, and methods, a "angle- and wavelength-multiplexed HOE" may or may not be transparent to certain wavelengths of light (e.g., to visible light having a wavelength or wavelengths that is/are not provided by SLP 220, such as most environmental light 295) while an AWMHC, such as AWMHC 230, includes an angle- and wavelength-multiplexed HOE that is transparent to certain wavelength of light (e.g., to visible light having a wavelength or wavelengths that is/are not provided by SLP 220, such as most environmental light 295) in order to "combine" light from SLP 220 and environmental light 295 into a single field of view at eye 290.

Figure 3:
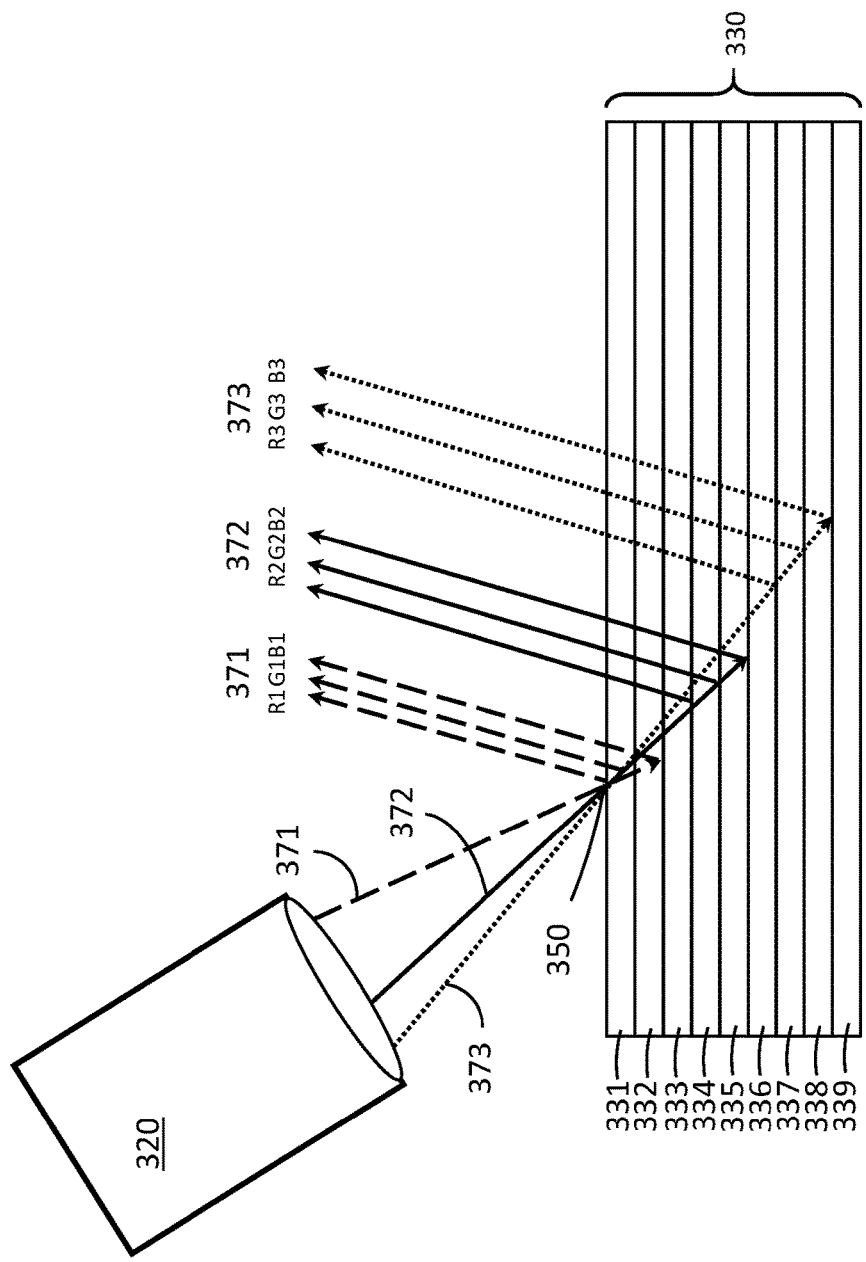
FIG. 3 is an illustrative diagram showing an exemplary operation of an angle- and wavelength-multiplexed HOE 330 in accordance with the present systems, devices, and methods.

WHUD 200 includes an optic 240 that receives light signals from SLP 220 and divides, replicates, routes, or splits the light signals into three sets of light signals: first set of light signals 271 (represented by lines with large dashes in FIG. 3), second set of light signals 272 (represented by solid lines in FIG. 3), and third set of light signals 273 (represented by dotted lines in FIG. 3). Optic 240 routes the light signals from SLP 220 to AWMHC 230 in such a way that each respective set of light signals 271, 272, and 273 follows a respective range of optical paths that corresponds to a respective range of angles of incidence on AWMHC 230. If desired, SLP 220 may be modulated so that each respective set of light signals 271, 272, and 273 corresponds to a respective angle-multiplexed instance of the same RGB display content.

AWMHC 230 includes an angle- and wavelength-multiplexed HOE comprising three layers of holographic material: a first layer of holographic material 231 that includes a first angle-multiplexed set of wavelength-multiplexed holograms (e.g., a first red hologram, a first green hologram, and a first blue hologram) all of which are engineered to respond to light signals over a first range of angles of incidence that corresponds to the range of angles of incidence of first set of light signals 271, a second layer of holographic material 232 that includes a second angle-multiplexed set of wavelength-multiplexed holograms (e.g., a second red hologram, a second green hologram, and a second blue hologram) all of which are engineered to respond to light signals over a second range of angles of incidence that corresponds to the range of angles of incidence of second set of light signals 272, and a third layer of holographic material 233 that includes a third angle-multiplexed set of wavelength-multiplexed holograms (e.g., a third red hologram, a third green hologram, and a third blue hologram) all of which are engineered to respond to light signals over a third range of angles of incidence that corresponds to the range of angles of incidence of third set of light signals 273. The spatial separation between the three layers of holographic material 231, 232 and, 233 in AWMHC 230 is exaggerated in FIG. 2 for emphasis (e.g., partially exploded), whereas in principle the three layers of holographic material 231, 232, 233 may be much closer than illustrated and/or pressed together to form a laminate structure.

Each respective angle-multiplexed set of wavelength-multiplexed holograms carried by the three layers of holographic material 231, 232, and 233 of AWMHC 230 includes a respective red hologram, a respective green hologram, and a respective blue hologram because SLP 220 includes a red laser diode (labeled R in laser module 221) to provide a red component in lights signals 271, 272, and 273, a green laser diode (labeled G in laser module 221) to provide a green component in light signals 271, 272, and 273, and a blue laser diode (labeled B in laser module 221) to provide a blue component in light signals 271, 272, and 273. Each respective angle-multiplexed set of wavelength-multiplexed holograms respectively carried by layers of holographic material 231, 232, and 233 in AWMHC 230 may respond to (e.g., redirect by reflecting and converging) a respective one of each set of light signals 271, 272, and 273 (based on angle of incidence) towards a respective spatially-separated exit pupil 281, 282, and 283 at eye 290 in order to provide an expanded or otherwise engineered eyebox 280 at eye 290.

In some alternative implementations, the at least one layer of holographic material in an angle- and wavelength-multiplexed HOE such as AWMHC 230 may include a single first layer of holographic material and all of the holograms in all of the angle-multiplexed sets of wavelength-multiplexed holograms may be included in the single first layer of holographic material. In other alternative implementations, the at least one layer of holographic material in an angle- and wavelength-multiplexed HOE such as AWMHC 230 may include a stack of layers of holographic material where each hologram in the various angle-multiplexed sets of wavelength-multiplexed holograms is included in a respective layer of the stack of layers of holographic material (or in other words, each layer in the stack of layers of holographic material includes a respective hologram). For example, in AWMHC 230, each respective layer of holographic material 231, 232, and 233 may itself comprise a respective set of three layers of holographic material, and each layer of holographic material in each respective set of three layers of holographic material 231, 232, and 233 may include a respective hologram. Thus, first layer of holographic material 231 may itself comprise a first sub-layer that includes a first red hologram, a second sub-layer that includes a first green hologram, and a third sub-layer that includes a first blue hologram; second layer of holographic material 232 may itself comprise a fourth sub-layer that includes a second red hologram, a fifth sub-layer that includes a second green hologram, and a sixth sub-layer that includes a second blue hologram; and third layer of holographic material 233 may itself comprise a seventh sub-layer that includes a third red hologram, an eighth sub-layer that includes a third green hologram, and a ninth sub-layer that includes a third blue hologram.

FIG. 3 is an illustrative diagram showing an exemplary operation of an angle- and wavelength-multiplexed HOE 330 in accordance with the present systems, devices, and methods. HOE 330 comprises a stack of nine layers of holographic material 331, 332, 333, 334, 335, 336, 337, 338, and 339 arranged one on top of the other in a laminate structure. Each respective layer in the stack of nine layers 331, 332, 333, 334, 335, 336, 337, 338, and 339 includes at least one respective hologram.

In order to show an exemplary operation of HOE 330, FIG. 3 includes a SLP 320 shown projecting three light signals 371, 372, 373 all towards a single point 350 on the surface of HOE 330 but each from a different angle. That is, SLP 320 projects first light signal 371 (represented by a line with large dashes in FIG. 3) towards point 350 of HOE 330 at a first angle, SLP 320 projects second light signal 372 (represented by a solid line in FIG. 3) towards point 350 of HOE 330 at a second angle, and SLP 320 projects third light signal 373 (represented by a dotted line in FIG. 3) towards point 350 of HOE 330 at a third angle. Each of first light signal 371, second light signal 372, and third light signal 373 comprises a respective red component, a respective green component, and a respective blue component.

In accordance with the present systems, devices, and methods, angle- and wavelength-multiplexed HOE 330 comprises three angle-multiplexed sets of three wavelength multiplexed holograms, giving nine holograms in total. As previously described, each respective one of these nine holograms is included in a respective one of the layers in the stack of nine layers 331, 332, 333, 334, 335, 336, 337, 338, and 339. More specifically, HOE 330 comprises a first set of three wavelength-multiplexed holograms 331, 332, and 333 (i.e., a first red hologram, a first green hologram, and a first blue hologram), each of which plays back for light signals that are incident on HOE 330 (e.g., at point 350 on HOE 330) over a first range of angles of incidence that includes the angle of incidence of first light signal 371. In the illustrated example, first layer 331 of HOE 330 is a first red hologram and is shown reflecting a red component R1 of first light signal 371, second layer 332 of HOE 330 is a first green hologram and is shown reflecting a green component G1 of first light signal 371, and third layer 333 of HOE 330 is a first blue hologram and is shown reflecting a blue component B1 of first light signal 371. Second light signal 372 and third light signal 373 are transmitted through layers 331, 332, and 333 of HOE 330 because second light signal 372 and third light signal 373 are each incident on HOE 330 (e.g., at point 350 of HOE 330) at an angle of incidence that is outside of the first range of angles of incidence over which layers 331, 332, and 333 of HOE 330 are responsive.

HOE 330 further comprises a second set of three wavelength-multiplexed holograms 334, 335, and 336 (i.e., a second red hologram, a second green hologram, and a second blue hologram), each of which plays back for light signals that are incident on HOE 330 (e.g., at point 350 on HOE 330) over a second range of angles of incidence that includes the angle of incidence of second light signal 372. In the illustrated example, fourth layer 334 of HOE 330 is a second red hologram and is shown reflecting a red component R2 of second light signal 372, fifth layer 335 of HOE 330 is a second green hologram and is shown reflecting a green component G2 of second light signal 372, and sixth layer 336 of HOE 330 is a second blue hologram and is shown reflecting a blue component B2 of second light signal 372. Third light signal 373 is transmitted through layers 334, 335, and 336 of HOE 330 because third light signal 373 is incident on HOE 330 (e.g., at point 350 of HOE 330) at an angle of incidence that is outside of the second range of angles of incidence over which layers 334, 335, and 336 of HOE 330 are responsive.

HOE 330 further comprises a third set of three wavelength-multiplexed holograms 337, 338, and 339 (i.e., a third red hologram, a third green hologram, and a third blue hologram), each of which plays back for light signals that are incident on HOE 330 (e.g., at point 350 on HOE 330) over a third range of angles of incidence that includes the angle of incidence of third light signal 373. In the illustrated example, seventh layer 337 of HOE 330 is a third red hologram and is shown reflecting a red component R3 of third light signal 373, eighth layer 338 of HOE 330 is a third green hologram and is shown reflecting a green component G3 of third light signal 373, and ninth layer 339 of HOE 330 is a third blue hologram and is shown reflecting a blue component B3 of third light signal 373.

In the illustrated example of FIG. 3, the large spatial separation between the R, G, and B components of each light signal (e.g., the large spatial separation of the R1, G1, and B1 components of first light signal 371) after reflection from HOE 330 is a consequence of the exaggerated thicknesses of the layers in the stack of nine layers 331, 332, 333, 334, 335, 336, 337, 338, and 339. In practice, each layer in stack of nine layers 331, 332, 333, 334, 335, 336, 337, 338, and 339 may be sufficiently thin that any such spatial separation of R, G, and B components is either negligible or may be compensated in the modulation pattern provided by SLP 320. Furthermore, as previously described, some implementations of the present systems, devices, and methods may employ an angle- and wavelength-multiplexed HOE in which multiple wavelength-multiplexed holograms (e.g., all wavelength-multiplexed holograms in an angle-multiplexed set of wavelength-multiplexed holograms) are all included in a single layer of holographic material, or even all angle-multiplexed sets of wavelength-multiplexed holograms may be included in a single layer of holographic material. In such implementations, little to no spatial separation between different color components of a single light signal is likely to occur.

In accordance with the present systems, devices, and methods, each respective hologram of AWMHC 230 applies a respective optical function to the respective light signal or set of light signals to which it is responsive. Generally, the optical function applied by any given hologram in an AWMHC may be independent of the optical function(s) applied by other holograms in the AWMHC and may include, for example, reflecting the light, converging the light, collimating the light, diverging the light, and so on. In the exemplary WHUD applications described herein, all of the holograms in each angle-multiplexed set of wavelength-multiplexed holograms (e.g., each respective set of a red hologram, a green hologram, and a blue hologram that are all responsive to light signals that are incident thereon within a same range of angles of incidence) may apply a same optical function. For example, all of the holograms in each respective angle-multiplexed set of wavelength-multiplexed holograms may converge light towards a same focus, such focus generally being positioned behind the eye of the user so that an exit pupil that is larger than the focus is formed at the eye of the user. In the illustrated example of WHUD 200, the respective optical functions applied by the holograms in the first angle-multiplexed set of wavelength-multiplexed holograms included in first layer of holographic material 231 all involve converging first set of light signals 271 to first exit pupil 281 at eye 290; the respective optical functions applied by the holograms in the second angle-multiplexed set of wavelength-multiplexed holograms included in second layer of holographic material 232 all involve converging second set of light signals 272 to second exit pupil 282 at eye 290; and the respective optical functions applied by the holograms in the third angle-multiplexed set of wavelength-multiplexed holograms included in third layer of holographic material 233 all involve converging third set of light signals 273 to third exit pupil 283 at eye 290.

FIG. 4 is a flow-diagram showing a method 400 of operating a WHUD in accordance with the present systems, devices, and methods. The WHUD may be substantially similar to WHUD 100 or WHUD 200 and generally includes a SLP and an AWMHC. Method 400 includes eight acts 401, 402, 403, 404, 405, 406, 407, and 408, though those of skill in the art will appreciate that in alternative embodiments certain acts may be omitted and/or additional acts may be added. Those of skill in the art will also appreciate that the illustrated order of the acts is shown for exemplary purposes only and may change in alternative embodiments. For the purpose of method 400, the term "user" refers to a person that is wearing the WHUD.

At 401, the SLP directs a first light signal that comprises a first wavelength of light (e.g., a first red light signal) towards the AWMHC at a first angle of incidence.

At 402, the SLP directs a second light signal that comprises a second wavelength of light (e.g., a first green light signal) towards the AWMHC at the same first angle of incidence from act 401.

At 403, a first hologram (e.g., a first red hologram) in a first angle-multiplexed set of wavelength-multiplexed holograms of the AWMHC redirects the first light signal (e.g., the first red light signal) towards a first exit pupil at or proximate the eye. The first hologram may redirect the first light signal towards the first exit pupil by converging, collimating, or diverging the first light signal towards the first exit pupil, with or without also reflecting the first light signal towards the first exit pupil.

At 404, a second hologram (e.g., a first green hologram) in the same first angle-multiplexed set of wavelength-multiplexed holograms of the AWMHC from act 403 redirects the second light signal (e.g., the first green light signal) towards the same first exit pupil at or proximate the eye from act 403. The second hologram may redirect the second light signal towards the first exit pupil by converging, collimating, or diverging the second light signal towards the first exit pupil, with or without also reflecting the second light signal towards the first exit pupil.

At 405, the SLP directs a third light signal that comprises the same first wavelength of light from act 401 (e.g., a second red light signal) towards the AWMHC at a second angle of incidence. The second angle of incidence is different from the first angle of incidence.

At 406, the SLP directs a fourth light signal that comprises the same second wavelength of light from act 402 (e.g., a second green light signal) towards the AWMHC at the same second angle of incidence from act 405.

At 407, a third hologram (e.g., a second red hologram) in a second angle-multiplexed set of wavelength-multiplexed holograms of the AWMHC redirects the third light signal (e.g., the second red light signal) towards a second exit pupil at or proximate the eye of the user. The third hologram may redirect the third light signal towards the second exit pupil by converging, collimating, or diverging the third light signal towards the second exit pupil, with or without also reflecting the third light signal towards the second exit pupil.

At 408, a fourth hologram (e.g., a second green hologram) in the same second angle-multiplexed set of wavelength-multiplexed holograms of the AWMHC from act 407 redirects the fourth light signal (e.g., the second green light signal) towards the same second exit pupil at or proximate the eye of the user from act 407. The fourth hologram may redirect the fourth light signal towards the second exit pupil by converging, collimating, or diverging the fourth light signal towards the second exit pupil, with or without also reflecting the fourth light signal towards the second exit pupil.

In some implementations, method 500 may be extended to add additional wavelengths (i.e., colors) to the display content. For example, the SLP may further direct a fifth light signal that comprises a third wavelength of light (e.g., a first blue light signal) towards the AWMHC at the same first angle of incidence from acts 401 and 402 and a sixth light signal that comprises the third wavelength of light (e.g., a second blue light signal) towards the AWMHC at the same second angle of incidence from acts 405 and 406. In this case, a fifth hologram (e.g., a first blue hologram) in the first angle-multiplexed set of wavelength-multiplexed holograms of the AWMHC may redirect the fifth light signal (e.g., the first blue light signal) towards the first exit pupil and a sixth hologram (e.g., a second blue hologram) in the second angle-multiplexed set of wavelength-multiplexed holograms of the AWMHC may redirect the sixth light signal (e.g., the second blue light signal) towards the second exit pupil.

In some implementations, method 500 may be extended to add additional exit pupils to the eyebox of the WHUD. For example, the SLP may further direct a fifth light signal that comprises the first wavelength of light (e.g., a third red light signal) towards the AWMHC at a third angle of incidence and a sixth light signal that comprises the second wavelength of light (e.g., a third green light signal) towards the AWMHC at the same third angle of incidence. In this case, a fifth hologram (e.g., a third red hologram) in a third angle-multiplexed set of wavelength-multiplexed holograms of the AWMHC may redirect the fifth light signal (e.g., the third red light signal) towards a third exit pupil at or proximate the eye of the user and a sixth hologram (e.g., a third green hologram) in the same third angle-multiplexed set of wavelength-multiplexed holograms of the AWMHC may redirect the sixth light signal (e.g., the third green light signal) towards the same third exit pupil.

When an AWMHC is used to produce multiple exit pupils, the resulting exit pupils may be engineered to interact in a wide variety of different ways. For example, the exit pupils may all be physically separated from one another, respective portions of two or more exit pupils may overlap, the entirety of one exit pupil may be included within another exit pupil, and so on. The specific exit pupil arrangement used depends on the content being displayed, the interface therefor, and other details of the specific implementation.

A person of skill in the art will appreciate that the term "wavelength" is used loosely herein to refer to a relatively narrow (e.g., within 10% or 15%) waveband of light, as most "single wavelength" laser diodes generally provide light signals over such a narrow waveband. Thus, throughout this specification and the appended claims, a hologram is said to be "responsive to" or "play back for" a first wavelength, such should be interpreted as "a first range of wavelengths characterized by a first wavelength ±15%." Furthermore, a person of skill in the art of holography will appreciate that the "wavelength responsiveness" of a wavelength-specific hologram (e.g., a wavelength-multiplexed hologram) may depend on the angle of incidence to some extent, thus references to a hologram that is "responsive to a first wavelength" should generally by construed as "responsive to a first wavelength within the range of angles of incidence of the application."

The angle- and wavelength-multiplexed HOEs described herein may generally be substantially flat or planar in geometry or, as illustrated in FIG. 2, may embody some curvature. In some implementations, an AWMHC (e.g., AWMHC 230) may embody curvature because the AWMHC is carried by a prescription eyeglass lens (e.g., 240) that has some curvature. When necessary, an AWMHC may include systems, devices, and/or methods for curved holographic optical elements described in U.S. Provisional Patent Application Ser. No. 62/268,892.

The various embodiments described herein provide systems, devices, and methods for combined angle- and wavelength-multiplexing in scanning laser-based WHUDs. Each multiplexed exit pupil is aligned to a respective spatially-separated position at or proximate the eye of the user because the AWMHC selectively routes the light signals along spatially-separated optical paths. The effect is substantially the same as if multiple SLPs and/or multiple holographic combiners were used instead of the AWMHC, however, the use of the AWMHC has considerable advantages in terms of power savings and minimizing hardware bulk.

A person of skill in the art will appreciate that the present systems, devices, and methods may be applied or otherwise incorporated into WHUD architectures that employ one or more light source(s) other than a SLP. For example, in some implementations the SLP described herein may be replaced by another light source, such as a light source comprising one or more light-emitting diodes ("LEDs"), one or more organic LEDs ("OLEDs"), one or more digital light processors ("DLPs"). Such non-laser implementations may advantageously employ additional optics to collimate, focus, and/or otherwise direct projected light signals. Unless the specific context requires otherwise, a person of skill in the art will appreciate that references to a "SLP" throughout the present systems, devices, and methods are generic to other light sources (combined with other optics, as necessary) that may be applied or adapted for application to accomplish the same general function(s) associated with the SLPs described herein.

A person of skill in the art will appreciate that the various embodiments for combined angle- and wavelength-multiplexing described herein may be applied in non-WHUD applications. For example, the present systems, devices, and methods may be applied in non-wearable heads-up displays and/or in other projection displays, including virtual reality displays, in which the holographic combiner need not necessarily be transparent.

In some implementations that employ multiple exit pupils, all exit pupils may optionally be active at all times (allowing for temporal separation). Alternatively, some WHUD implementations may employ eye-tracking to determine the particular display region(s) towards which the user is gazing and may activate only the exit pupil(s) that correspond(s) to where the user is looking while one or more exit pupil(s) that is/are outside of the user's field of view may be deactivated. An eye tracker included in any of the implementations of WHUDs described herein may employ any of a variety of different eye tracking technologies depending on the specific implementation. For example, an eye tracker may employ any or all of the systems, devices, and methods described in U.S. Provisional Patent Application Ser. No. 62/167,767; U.S. Provisional Patent Application Ser. No. 62/271,135; U.S. Provisional Patent Application Ser. No. 62/245,792; and/or U.S. Provisional Patent Application Ser. No. 62/281,041.

Multiplexed exit pupils may advantageously enable a user to see displayed content while gazing in a wide range of directions. Furthermore, multiplexed exit pupils may also enable a wider variety of users having a wider range of eye arrangements to adequately see displayed content via a given WHUD. Anatomical details such as interpupillary distance, eye shape, relative eye positions, and so on can all vary from user to user. The various exit pupil multiplexing methods described herein may be used to render a WHUD more robust over (and therefore more usable by) a wide variety of users having anatomical differences. In order to even further accommodate physical variations from user to user, the various WHUDs described herein may include one or more mechanical structure(s) that enable the user to controllably adjust the physical position and/or alignment of one or more exit pupil(s) relative to their own eye(s). Such mechanical structures may include one or more hinge(s), dial(s), flexure(s), tongue and groove or other slidably-coupled components, and the like. For example, at least one of the SLP and/or the optical splitter may be physically movable and/or rotatable on the support structure and the user may physically move and/or rotate the SLP and/or the optical splitter to change a position of at least one of the N exit pupils relative to the eye. Alternatively, the approaches taught herein may advantageously avoid the need for inclusion of such additional mechanical structures, allowing a smaller package and less weight than might otherwise be obtainable.

In some implementations, one or more optical fiber(s) may be used to guide light signals along some of the paths illustrated herein.

The various implementations described herein may, optionally, employ the systems, devices, and methods for preventing eyebox degradation described in U.S. Provisional Patent Application Ser. No. 62/288,947.

The WHUDs described herein may include one or more sensor(s) (e.g., microphone, camera, thermometer, compass, and/or others) for collecting data from the user's environment. For example, one or more camera(s) may be used to provide feedback to the processor of the WHUD and influence where on the display(s) any given image should be displayed.

The WHUDs described herein may include one or more on-board power sources (e.g., one or more battery(ies)), a wireless transceiver for sending/receiving wireless communications, and/or a tethered connector port for coupling to a computer and/or charging the one or more on-board power source(s). The WHUDs described herein may receive and respond to commands from the user in one or more of a variety of ways, including without limitation: voice commands through a microphone; touch commands through buttons, switches, or a touch sensitive surface; and/or gesture-based commands through gesture detection systems as described in, for example, U.S. Non-Provisional patent application Ser. No. 14/155,087, U.S. Non-Provisional patent application Ser. No. 14/155,107, PCT Patent Application PCT/US2014/057029, and/or U.S. Provisional Patent Application Ser. No. 62/236,060.

The various implementations of WHUDs described herein may include any or all of the technologies described in U.S. Provisional Patent Application Ser. No. 62/242,844.

Throughout this specification and the appended claims the term "communicative" as in "communicative pathway," "communicative coupling," and in variants such as "communicatively coupled," is generally used to refer to any engineered arrangement for transferring and/or exchanging information. Exemplary communicative pathways include, but are not limited to, electrically conductive pathways (e.g., electrically conductive wires, electrically conductive traces), magnetic pathways (e.g., magnetic media), and/or optical pathways (e.g., optical fiber), and exemplary communicative couplings include, but are not limited to, electrical couplings, magnetic couplings, and/or optical couplings.

Throughout this specification and the appended claims, infinitive verb forms are often used. Examples include, without limitation: "to detect," "to provide," "to transmit," "to communicate," "to process," "to route," and the like. Unless the specific context requires otherwise, such infinitive verb forms are used in an open, inclusive sense, that is as "to, at least, detect," to, at least, provide," "to, at least, transmit," and so on.

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art. The teachings provided herein of the various embodiments can be applied to other portable and/or wearable electronic devices, not necessarily the exemplary wearable electronic devices generally described above.

For instance, the foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, those skilled in the art will recognize that the embodiments disclosed herein, in whole or in part, can be equivalently implemented in standard integrated circuits, as one or more computer programs executed by one or more computers (e.g., as one or more programs running on one or more computer systems), as one or more programs executed by on one or more controllers (e.g., microcontrollers) as one or more programs executed by one or more processors (e.g., microprocessors, central processing units, graphical processing units), as firmware, or as virtually any combination thereof, and that designing the circuitry and/or writing the code for the software and or firmware would be well within the skill of one of ordinary skill in the art in light of the teachings of this disclosure.

When logic is implemented as software and stored in memory, logic or information can be stored on any processor-readable medium for use by or in connection with any processor-related system or method. In the context of this disclosure, a memory is a processor-readable medium that is an electronic, magnetic, optical, or other physical device or means that contains or stores a computer and/or processor program. Logic and/or the information can be embodied in any processor-readable medium for use by or in connection with an instruction execution system, apparatus, or device, such as a computer-based system, processor-containing system, or other system that can fetch the instructions from the instruction execution system, apparatus, or device and execute the instructions associated with logic and/or information.

In the context of this specification, a "non-transitory processor-readable medium" can be any element that can store the program associated with logic and/or information for use by or in connection with the instruction execution system, apparatus, and/or device. The processor-readable medium can be, for example, but is not limited to, an electronic, magnetic, optical, electromagnetic, infrared, or semiconductor system, apparatus or device. More specific examples (a non-exhaustive list) of the computer readable medium would include the following: a portable computer diskette (magnetic, compact flash card, secure digital, or the like), a random access memory (RAM), a read-only memory (ROM), an erasable programmable read-only memory (EPROM, EEPROM, or Flash memory), a portable compact disc read-only memory (CDROM), digital tape, and other non-transitory media.

The various embodiments described above can be combined to provide further embodiments. To the extent that they are not inconsistent with the specific teachings and definitions herein, all of the U.S. patents, U.S. patent application publications, U.S. patent applications, foreign patents, foreign patent applications and non-patent publications referred to in this specification and/or listed in the Application Data Sheet which are owned by Thalmic Labs Inc., including but not limited to: U.S. Provisional Patent Application Ser. No. 62/156,736, U.S. Non-Provisional patent application Ser. No. 15/046,234, U.S. Non-Provisional patent application Ser. No. 15/046,254, U.S. Non-Provisional patent application Ser. No. 15/046,269, U.S. Provisional Patent Application Ser. No. 62/322,128, U.S. Provisional Patent Application Ser. No. 62/214,600, U.S. Provisional Patent Application Ser. No. 62/268,892, U.S. Provisional Patent Application Ser. No. 62/167,767, U.S. Provisional Patent Application Ser. No. 62/271,135, U.S. Provisional Patent Application Ser. No. 62/245,792, U.S. Provisional Patent Application Ser. No. 62/281,041, U.S. Provisional Patent Application Ser. No. 62/288,947, U.S. Non-Provisional patent application Ser. No. 14/155,087, U.S. Non-Provisional patent application Ser. No. 14/155,107, PCT Patent Application PCT/US2014/057029, U.S. Provisional Patent Application Ser. No. 62/236,060, and/or U.S. Provisional Patent Application Ser. No. 62/242,844, are incorporated herein by reference, in their entirety. Aspects of the embodiments can be modified, if necessary, to employ systems, circuits and concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An angle- and wavelength-multiplexed holographic optical element ("HOE") comprising:
    at least one layer of holographic material that includes:
    a first set of wavelength-multiplexed holograms, wherein each respective hologram in the first set of wavelength-multiplexed holograms is responsive to light of a respective wavelength and unresponsive to light of other wavelengths, wherein all of the holograms in the first set of wavelength-multiplexed holograms are responsive to light that is incident thereon with an angle of incidence that is within a first range of angles of incidence and unresponsive to light that is incident thereon with an angle of incidence that is outside of the first range of angles of incidence, wherein the first set of wavelength-multiplexed holograms includes a first hologram that is responsive to light of a first wavelength and unresponsive to light of other wavelengths and a second hologram that is responsive to light of a second wavelength and unresponsive to light of other wavelengths, the second wavelength different from the first wavelength, wherein the first set of wavelength-multiplexed holograms directs a first set of light signals to a first location, and wherein each respective hologram in the first set of wavelength-multiplexed holograms converges light of a respective wavelength to a same first focus; and
    a second set of wavelength-multiplexed holograms, wherein each respective hologram in the second set of wavelength-multiplexed holograms is responsive to light of a respective wavelength and unresponsive to light of other wavelengths, wherein all of the holograms in the second set of wavelength-multiplexed holograms are responsive to light that is incident thereon with an angle of incidence that is within a second range of angles of incidence and unresponsive to light that is incident thereon with an angle of incidence that is outside of the second range of angles of incidence, the second range of angles of incidence different from and non-overlapping with the first range of angles of incidence, wherein the second set of wavelength-multiplexed holograms includes a first hologram that is responsive to light of the first wavelength and unresponsive to light of other wavelengths and a second hologram that is responsive to light of the second wavelength and unresponsive to light of other wavelengths, and wherein the second set of wavelength-multiplexed holograms directs a second set of light signals to a second distinct location, wherein the second set of light signals is discrete from the first set of light signals, wherein the first set of wavelength-multiplexed holograms is unresponsive to the second set of light signals and the second set of light signals passes through at least one hologram of the first set of wavelength-multiplexed holograms before incidence on the second set of wavelength-multiplexed holograms, and wherein each respective hologram in the second set of wavelength-multiplexed holograms converges light of a respective wavelength to a same second focus, the second focus spatially separated from the first focus.

2. The angle- and wavelength-multiplexed HOE of claim 1 wherein:
    the first set of wavelength-multiplexed holograms includes a third hologram that is responsive to light of a third wavelength and unresponsive to light of other wavelengths, the third wavelength different from both the first wavelength and the second wavelength; and
    the second set of wavelength-multiplexed holograms includes a third hologram that is responsive to light of the third wavelength and unresponsive to light of other wavelengths.

3. The angle- and wavelength-multiplexed HOE of claim 1 wherein:
    each respective hologram in the first set of wavelength-multiplexed holograms applies a same first optical function to light of a respective wavelength; and
    each respective hologram in the second set of wavelength-multiplexed holograms applies a same second optical function to light of a respective wavelength, the second optical function different from the first optical function.

4. The angle- and wavelength-multiplexed HOE of claim 3 wherein both the first optical function and the second optical function include a reflection function.

5. The angle- and wavelength-multiplexed HOE of claim 1 wherein at least one layer of holographic material includes a holographic material selected from a group consisting of: a holographic film, a silver halide compound, and a photopolymer.

6. The angle- and wavelength-multiplexed HOE of claim 1 wherein the at least one layer of holographic material includes a first layer of holographic material and both the first set of wavelength-multiplexed holograms and the second set of wavelength-multiplexed holograms are included in the first layer of holographic material.

7. The angle- and wavelength-multiplexed HOE of claim 1 wherein the at least one layer of holographic material includes a first layer of holographic material that includes the first set of wavelength-multiplexed holograms and a second layer of holographic material that includes the second set of wavelength-multiplexed holograms, the second layer of holographic material carried by the first layer of holographic material.

8. The angle- and wavelength-multiplexed HOE of claim 1 wherein the at least one layer of holographic material includes a stack of layers of holographic material comprising:
a first set of layers of holographic material, wherein each layer of holographic material in the first set of layers of holographic material includes a respective one of the wavelength-multiplexed holograms in the first set of wavelength-multiplexed holograms; and
a second set of layers of holographic material, wherein each layer of holographic material in the second set of layers of holographic material includes a respective one of the wavelength-multiplexed holograms in the second set of wavelength-multiplexed holograms.

9. The angle- and wavelength-multiplexed HOE of claim 1, further comprising:
at least one additional set of wavelength-multiplexed holograms, wherein for each additional set of wavelength-multiplexed holograms:
each respective wavelength-multiplexed hologram in the set of wavelength-multiplexed holograms is responsive to light of a respective wavelength and unresponsive to light of other wavelengths; and
all of the wavelength-multiplexed holograms in the set of wavelength-multiplexed holograms are responsive to light that is incident thereon with an angle of incidence that is within a particular range of angles of incidence and unresponsive to light that is incident thereon with an angle of incidence that is outside of the particular range of angles of incidence, and
wherein each additional set of wavelength-multiplexed holograms is responsive to light that is incident thereon with an angle of incidence that is within a respective range of angles of incidence and unresponsive to light that is incident thereon with an angle of incidence that is outside of the respective range of angles of incidence.

10. A wearable heads-up display ("WHUD") comprising:
a support structure that in use is worn on a head of a user;
a scanning laser projector carried by the support structure; and
an angle- and wavelength-multiplexed holographic combiner carried by the support structure, wherein the angle- and wavelength-multiplexed holographic combiner is positioned within a field of view of an eye of the user when the support structure is worn on the head of the user, and wherein the angle- and wavelength-multiplexed holographic combiner comprises at least one layer of holographic material, the at least one layer of holographic material including:
a first set of wavelength-multiplexed holograms, wherein each respective hologram in the first set of wavelength-multiplexed holograms is responsive to light of a respective wavelength and unresponsive to light of other wavelengths, wherein all of the wavelength-multiplexed holograms in the first set of wavelength-multiplexed holograms are positioned and oriented to converge light from the scanning laser projector that is incident thereon with an angle of incidence that is within a first range of angles of incidence to a same first exit pupil at or proximate the eye of the user, and wherein each respective hologram in the first set of wavelength-multiplexed holograms converges light of a respective wavelength to a same first focus; and a second set of wavelength-multiplexed holograms, wherein each respective hologram in the second set of wavelength-multiplexed holograms is responsive to light of a respective wavelength and unresponsive to light of other wavelengths, wherein all of the wavelength-multiplexed holograms in the second set of wavelength-multiplexed holograms are positioned and oriented to converge light from the scanning laser projector that is incident thereon with an angle of incidence that is within a second range of angles of incidence to a same second exit pupil at or proximate the eye of the user, the second exit pupil spatially-separated from the first exit pupil at the eye of the user and the second range of angles of incidence different from and non-overlapping with the first range of angles of incidence, and wherein each respective hologram in the second set of wavelength-multiplexed holograms converges light of a respective wavelength to a same second focus, the second focus spatially separated from the first focus.

11. The WHUD of claim 10 wherein the support structure has a general shape and appearance of an eyeglasses frame, and wherein the angle- and wavelength-multiplexed holographic combiner further comprises an eyeglass lens that carries the at least one layer of holographic material.

12. The WHUD of claim 10 wherein for the angle- and wavelength-multiplexed holographic combiner:
the first set of wavelength-multiplexed holograms includes a first hologram that is responsive to light of a first wavelength and unresponsive to light of other wavelengths and a second hologram that is responsive to light of a second wavelength and unresponsive to light of other wavelengths, the second wavelength different from the first wavelength; and
the second set of wavelength-multiplexed holograms includes a first hologram that is responsive to light of the first wavelength and unresponsive to light of other wavelengths and a second hologram that is responsive to light of the second wavelength and unresponsive to light of other wavelengths.

13. The WHUD of claim 12 wherein for the angle- and wavelength-multiplexed holographic combiner:
the first set of wavelength-multiplexed holograms includes a third hologram that is responsive to light of a third wavelength and unresponsive to light of other wavelengths, the third wavelength different from both the first wavelength and the second wavelength; and
the second set of wavelength-multiplexed holograms includes a third hologram that is responsive to light of the third wavelength and unresponsive to light of other wavelengths.

14. The WHUD of claim 10 wherein for the angle- and wavelength-multiplexed holographic combiner:
the at least one layer of holographic material includes a first layer of holographic material and both the first set of wavelength-multiplexed holograms and the second set of wavelength-multiplexed holograms are included in the first layer of holographic material.

15. The WHUD of claim 10 wherein for the angle- and wavelength-multiplexed holographic combiner:
the at least one layer of holographic material includes a first layer of holographic material that includes the first set of wavelength-multiplexed holograms and a second layer of holographic material that includes the second set of wavelength-multiplexed holograms, the second layer of holographic material carried by the first layer of holographic material.

16. The WHUD of claim 10 wherein for the angle- and wavelength-multiplexed holographic combiner, the at least one layer of holographic material includes a stack of layers of holographic material comprising:
  a first set of layers of holographic material, wherein each layer of holographic material in the first set of layers of holographic material includes a respective one of the wavelength-multiplexed holograms in the first set of wavelength-multiplexed holograms; and
  a second set of layers of holographic material, wherein each layer of holographic material in the second set of layers of holographic material includes a respective one of the wavelength-multiplexed holograms in the second set of wavelength-multiplexed holograms.

17. The WHUD of claim 10 wherein the angle- and wavelength-multiplexed holographic combiner further comprises at least one additional set of wavelength-multiplexed holograms, and wherein for each additional set of wavelength-multiplexed holograms:
  each respective wavelength-multiplexed hologram in the set of wavelength-multiplexed holograms is responsive to light of a respective wavelength and unresponsive to light of other wavelengths; and
  all of the wavelength-multiplexed holograms in the set of wavelength-multiplexed holograms are positioned and oriented to converge light from the scanning laser projector that is incident thereon with an angle of incidence that is within a particular range of angles of incidence to a same exit pupil at or proximate the eye of the user, and
  wherein each additional set of wavelength-multiplexed holograms is positioned and oriented to converge light from the scanning laser projector that is incident thereon with an angle of incidence that is within a respective range of angles of incidence to a same respective exit pupil at or proximate the eye of the user.

18. The WHUD of claim 10, further comprising:
  an optic carried by the support structure, wherein the optic is positioned in between the scanning laser projector and the angle- and wavelength-multiplexed holographic combiner in an optical path of light from the scanning laser projector, and wherein the optic is oriented to receive light from the scanning laser projector and separate the light into the first range of angles of incidence at the angle- and wavelength-multiplexed holographic combiner and the second range of angles of incidence at the angle- and wavelength-multiplexed holographic combiner.

19. A method of operating a wearable heads-up display ("WHUD"), the WHUD including a scanning laser projector and an angle- and wavelength-multiplexed holographic combiner positioned within a field of view of an eye of a user when the WHUD is worn on a head of the user, the method comprising:
  directing a first light signal towards the angle- and wavelength-multiplexed holographic combiner at a first angle of incidence by the scanning laser projector, wherein the first light signal comprises a first wavelength of laser light;
  directing a second light signal towards the angle- and wavelength-multiplexed holographic combiner at the first angle of incidence by the scanning laser projector, wherein the second light signal comprises a second wavelength of laser light;
  converging the first light signal towards a first exit pupil at or proximate the eye of the user by a first hologram in a first set of wavelength-multiplexed holograms of the angle- and wavelength-multiplexed holographic combiner;
  converging the second light signal towards the first exit pupil at or proximate the eye of the user by a second hologram in the first set of wavelength-multiplexed holograms of the angle- and wavelength-multiplexed holographic combiner;
  directing a third light signal towards the angle- and wavelength-multiplexed holographic combiner at a second angle of incidence by the scanning laser projector, wherein the second angle of incidence is different from the first angle of incidence and the third light signal comprises the first wavelength of laser light;
  directing a fourth light signal towards the angle- and wavelength-multiplexed holographic combiner at the second angle of incidence by the scanning laser projector, wherein the fourth light signal comprises the second wavelength of laser light;
  converging the third light signal towards a second exit pupil at or proximate the eye of the user by a first hologram in a second set of wavelength-multiplexed holograms of the angle- and wavelength-multiplexed holographic combiner; and
  converging the fourth light signal towards the second exit pupil at or proximate the eye of the user by a second hologram in the second set of wavelength-multiplexed holograms of the angle- and wavelength-multiplexed holographic combiner.

20. The method of claim 19, further comprising:
  directing a fifth light signal towards the angle- and wavelength-multiplexed holographic combiner at the first angle of incidence by the scanning laser projector, wherein the fifth light signal comprises a third wavelength of laser light;
  directing a sixth light signal towards the angle- and wavelength-multiplexed holographic combiner at the second angle of incidence by the scanning laser projector, wherein the sixth light signal comprises the third wavelength of laser light;
  redirecting the fifth light signal towards the first exit pupil at or proximate the eye of the user by a third hologram in the first set of wavelength-multiplexed holograms of the angle- and wavelength-multiplexed holographic combiner; and
  redirecting the sixth light signal towards the second exit pupil at or proximate the eye of the user by a third hologram in the second set of wavelength-multiplexed holograms of the angle- and wavelength-multiplexed holographic combiner.

21. The method of claim 19, further comprising:
  directing a fifth light signal towards the angle- and wavelength-multiplexed holographic combiner at a third angle of incidence by the scanning laser projector, wherein the third angle of incidence is different from both the first angle of incidence and the second angle of incidence, and wherein the fifth light signal comprises the first wavelength of laser light;
  directing a sixth light signal towards the angle- and wavelength-multiplexed holographic combiner at the third angle of incidence by the scanning laser projector, wherein the sixth light signal comprises the second wavelength of laser light;
  redirecting the fifth light signal towards a third exit pupil at or proximate the eye of the user by a first hologram in a third set of wavelength-multiplexed holograms of the angle- and wavelength-multiplexed holographic combiner; and redirecting the sixth light signal towards the third exit pupil at or proximate the eye of the user by a second hologram in the third set of wavelength-multiplexed holograms of the angle- and wavelength-multiplexed holographic combiner.

* * * * *